US008484259B1

(12) United States Patent
Makkar et al.

(10) Patent No.: US 8,484,259 B1
(45) Date of Patent: Jul. 9, 2013

(54) METADATA SUBSYSTEM FOR A DISTRIBUTED OBJECT STORE IN A NETWORK STORAGE SYSTEM

(75) Inventors: Gaurav Makkar, Bangalore (IN); Sudhir Srinivasan, Acton, MA (US); Ravi Kavuri, Inver Grove Heights, MN (US)

(73) Assignee: NetApp, Inc., Sunnyvale, CA (US)

( * ) Notice: Subject to any disclaimer, the term of this patent is extended or adjusted under 35 U.S.C. 154(b) by 284 days.

(21) Appl. No.: 12/853,191

(22) Filed: Aug. 9, 2010

Related U.S. Application Data

(63) Continuation-in-part of application No. 12/633,718, filed on Dec. 8, 2009, now Pat. No. 8,180,813.

(60) Provisional application No. 61/330,194, filed on Apr. 30, 2010.

(51) Int. Cl.
*G06F 17/30* (2006.01)

(52) U.S. Cl.
USPC ............................ 707/827; 707/803; 707/769

(58) Field of Classification Search
None
See application file for complete search history.

(56) References Cited

U.S. PATENT DOCUMENTS 5,544,360 A 8/1996 Lewak et al.
6,055,543 A * 4/2000 Christensen et al. ................. 1/1
7,028,071 B1 4/2006 Slik
7,065,616 B2 6/2006 Gajjar et al.
7,143,307 B1 11/2006 Witte et al.
7,171,469 B2 1/2007 Ackaouy et al.
7,191,290 B1 3/2007 Ackaouy et al.
7,284,030 B2 10/2007 Ackaouy et al.
7,376,796 B2 5/2008 Corbett et al.
7,415,506 B2 8/2008 Gajjar et al.
7,467,169 B2 12/2008 Gole et al.
7,512,673 B2 3/2009 Miloushev et al.
7,546,486 B2 6/2009 Slik et al.
7,552,223 B1 6/2009 Ackaouy et al.
7,590,672 B2 9/2009 Slik et al.
7,873,619 B1 1/2011 Faibish et al.
7,937,453 B1 5/2011 Hayden et al.
8,180,813 B1 5/2012 Goodson et al.
2002/0128995 A1 9/2002 Muntz et al.
2003/0046335 A1 3/2003 Doyle et al.
2003/0145086 A1 7/2003 O'Reilly
2003/0161499 A1* 8/2003 Svendsen et al. ............. 382/102
2004/0267830 A1 12/2004 Wong et al.
2005/0172010 A1* 8/2005 Malone et al. ................ 709/219
2005/0289193 A1* 12/2005 Arrouye et al. ............... 707/200
2006/0018506 A1* 1/2006 Rodriguez et al. ............ 382/100
2006/0179037 A1 8/2006 Turner et al.
2006/0271598 A1 11/2006 Wong et al.

(Continued)

OTHER PUBLICATIONS

Co-pending U.S. Appl. No. 12/633,725, filed Dec. 8, 2009.

(Continued)

*Primary Examiner* — Syed Hasan
(74) *Attorney, Agent, or Firm* — Perkins Coie LLP

(57) ABSTRACT

A network storage server system includes a distributed object store and a metadata subsystem. The metadata subsystem stores metadata relating to the stored data objects and allows data objects to be located and retrieved easily via user-specified search queries. It manages and allows searches on at least three categories of metadata via the same user interface and technique. These categories include user-specified metadata, inferred metadata and system-defined metadata. Search queries for the metadata can include multi-predicate queries.

26 Claims, 21 Drawing Sheets

U.S. PATENT DOCUMENTS

| | | | | |
|---|---|---|---|---|
| 2006/0282630 | A1 | 12/2006 | Hochberg et al. | |
| 2007/0022087 | A1 | 1/2007 | Bahar et al. | |
| 2007/0043715 | A1 | 2/2007 | Kaushik et al. | |
| 2007/0055689 | A1 * | 3/2007 | Rhoads et al. | 707/102 |
| 2007/0136391 | A1 | 6/2007 | Anzai et al. | |
| 2007/0239655 | A1 | 10/2007 | Agetsuma et al. | |
| 2008/0046538 | A1 | 2/2008 | Susarla et al. | |
| 2008/0208917 | A1 | 8/2008 | Smoot et al. | |
| 2008/0270684 | A1 | 10/2008 | Urmston et al. | |
| 2009/0030957 | A1 | 1/2009 | Manjunath | |
| 2012/0185646 | A1 | 7/2012 | Ikawa et al. | |

OTHER PUBLICATIONS

Co-pending U.S. Appl. No. 12/698,019, filed Feb. 1, 2010.

Co-pending U.S. Appl. No. 12/633,718, filed Dec. 8, 2009.

International Search Report PCT/US2010/059566 Mailed Aug. 2, 2011, pp. 1-3.

Written Opinion PCT/US2010/059566 Mailed Aug. 2, 2011, pp. 1-4.

Non-Final Office Action of U.S. Appl. No. 12/633,725 of Goodson, G., et al., filed Dec. 8, 2009.

Non-Final Office Action Mailed Nov. 10, 2011 in Co-Pending U.S. Appl. No. 12/633,725 of Goodson, G., et al., filed Dec. 8, 2009.

Non-Final Office Action Mailed Nov. 21, 2011 in Co-Pending U.S. Appl. No. 12/633,718 of Goodson, G., et al., filed Dec. 8, 2009.

Notice of Allowance Mailed Mar. 19, 2012 in Co-Pending U.S. Appl. No. 12/633,718 of Goodson, G., et al., filed Dec. 8, 2009.

Final Office Action Mailed Apr. 26, 2012 in Co-Pending U.S. Appl. No. 12/633,725 of Goodson, G., et al., filed Dec. 8, 2009.

Non-Final Office Action Mailed May 2, 2012 in Co-Pending U.S. Appl. No. 12/698,019 of Srinivasan, S., et al., filed Feb. 1, 2010.

Anderson, et al., "Global namespace for files", 2004, Ibm Systems Journal, pp. 702-721.

Final Office Action mailed Sep. 24, 2012 in Co-Pending U.S. Appl. No. 12/698,019 of Srinivasan, S., et al., filed Feb. 1, 2010.

Non-Final Office Action Mailed Jan. 22, 2013 in Co-Pending U.S. Appl. No. 12/698,019 of Srinivasan, S., et al., filed Feb. 1, 2010.

* cited by examiner

METADATA SUBSYSTEM FOR A DISTRIBUTED OBJECT STORE IN A NETWORK STORAGE SYSTEM

This application is a continuation-in-part of U.S. patent application Ser. No. 12/633,718 of G. Goodson et al., filed on Dec. 8, 2009 and entitled, "Content Repository Implemented in a Network Storage Server System," and claims the benefit of U.S. Provisional Patent Application No. 61/330,194, filed on Apr. 30, 2010, each of which is incorporated herein by reference.

FIELD OF THE INVENTION

At least one embodiment of the present invention pertains to network storage systems, and more particularly, to a metadata subsystem for a distributed object store in a network storage system.

BACKGROUND

Network based storage, or simply "network storage", is a common approach to backing up data, making large amounts of data accessible to multiple users, and other purposes. In a network storage environment, a storage server makes data available to client (host) systems by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

There are several recent trends in network storage technology. The first is that the amount of data being stored within a typical enterprise is approximately doubling from year to year. Second, there are now multiple classes of storage devices available on the market today, each with its own performance characteristics. These two trends together have caused users to want storage systems that mix different kinds of storage in such a way that it is possible to seamlessly move data across storage tiers, based on policies, for example.

In addition, users often would like to apply policies to collections of data objects. For example, an online social networking site/service might want to replicate all of its original size photos (e.g., photos of its members/users) three times, but not the thumbnail versions, since the thumbnails can be recreated from the originals. Yet today, setting policy within a storage system is a cumbersome process that has to be done out-of-band by a system administrator. Application writers and users cannot specify policies on groups of files/objects.

A problem associated with conventional storage systems is that the use of path names, such as in a traditional filesystem, imposes a hierarchical organization on the data, to which applications need to conform and use for different purposes, such as navigation and retrieval, access control, and data management. However, a hierarchical organization may not make sense for uses other than navigation and retrieval, and as a result, it can lead to inefficiencies such as duplication of content and consequent administrative overhead.

Furthermore, a hierarchical organization has also proven to be ineffective for navigation and retrieval. Consider a photo that is stored under a given path name, such as "/home/eng/myname/office.jpeg". In a traditional storage system, this name maps to a specific server/controller, a specific volume and a specific file location (e.g., inode number) within that volume. Thus, path names are tied to storage location.

These problems and others are addressed by a network storage system described in U.S. patent application Ser. No. 12/633,718 of G. Goodson et al., filed on Dec. 8, 2009 and entitled, "Content Repository Implemented in a Network Storage Server System" (hereinafter "Goodson"). The network storage system described in Goodson provides a content repository, which includes a distributed object store, a presentation layer, a metadata subsystem, and a policy-based management subsystem. The system can be implemented in a multi-node storage server cluster. The distributed object store described in Goodson stores data objects and is distributed across multiple interconnected storage server nodes, such as may exist in a clustered storage server system.

While such a system solves many problems, it also gives rise to various technical challenges. One of those challenges is how to allow efficient search and retrieval of data objects by users, particularly when the user does not know the name or identifier of the data object(s) of interest. To allow this and other functionality, an advanced metadata subsystem is needed to allow for full-featured creation and management of metadata for stored data objects.

SUMMARY

Introduced here is a network storage server system that implements a content repository. The system includes a distributed object store, a presentation layer, a metadata subsystem, and a policy-based management subsystem. The system can be implemented in a multi-node network storage cluster.

The distributed object store stores data objects and is distributed across multiple interconnected network nodes such as storage server nodes, such as may exist in a network storage cluster. The distributed object store is a "raw" object store with no associated namespace for the data objects and provides location-independent addressing of data objects, such that objects can be moved among logical containers without changing their addressing. It has an object address space and has the ability to span that object address space across other similar storage systems spread over geographic distances.

The metadata subsystem stores metadata relating to the stored data objects and allows data objects to be located and retrieved easily via user-specified search queries. It manages and allows searches on at least three categories of metadata via the same user interface and technique; these categories include user-specified metadata (e.g., user-defined tags), inferred metadata and system-defined metadata. Search queries for the metadata can include multi-predicate queries.

The metadata subsystem can implement multiple mutually isolated query domains, which can be user-defined. Multiple service instances of the metadata subsystem may exist in the network storage system, where each service instance resides on a different storage node. The multiple service instances can collectively implement one or more query domains.

The metadata is formed of attribute-value pairs, where each attribute-value pair can be assigned to a particular query domain. The metadata subsystem allows both fixed-schema storage and flexible-schema storage of metadata, and these two approaches can be applied concurrently. This gives the metadata subsystem the flexibility to allow data objects to have different metadata attributes and different numbers of metadata attributes. In certain embodiments, the metadata subsystem stores all metadata for each particular data object in the same storage node, which may be the node in which the corresponding data object is stored.

The metadata subsystem in certain embodiments uses a log structure to store, in a chronological order, metadata operations on data objects, and then updates the relevant metadata structures to reflect those operations in a "lazy" manner, i.e., the updates of the metadata structures are not directly triggered by the metadata operations.

Other aspects of the system and associated techniques will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

System Environment

Figure 1:
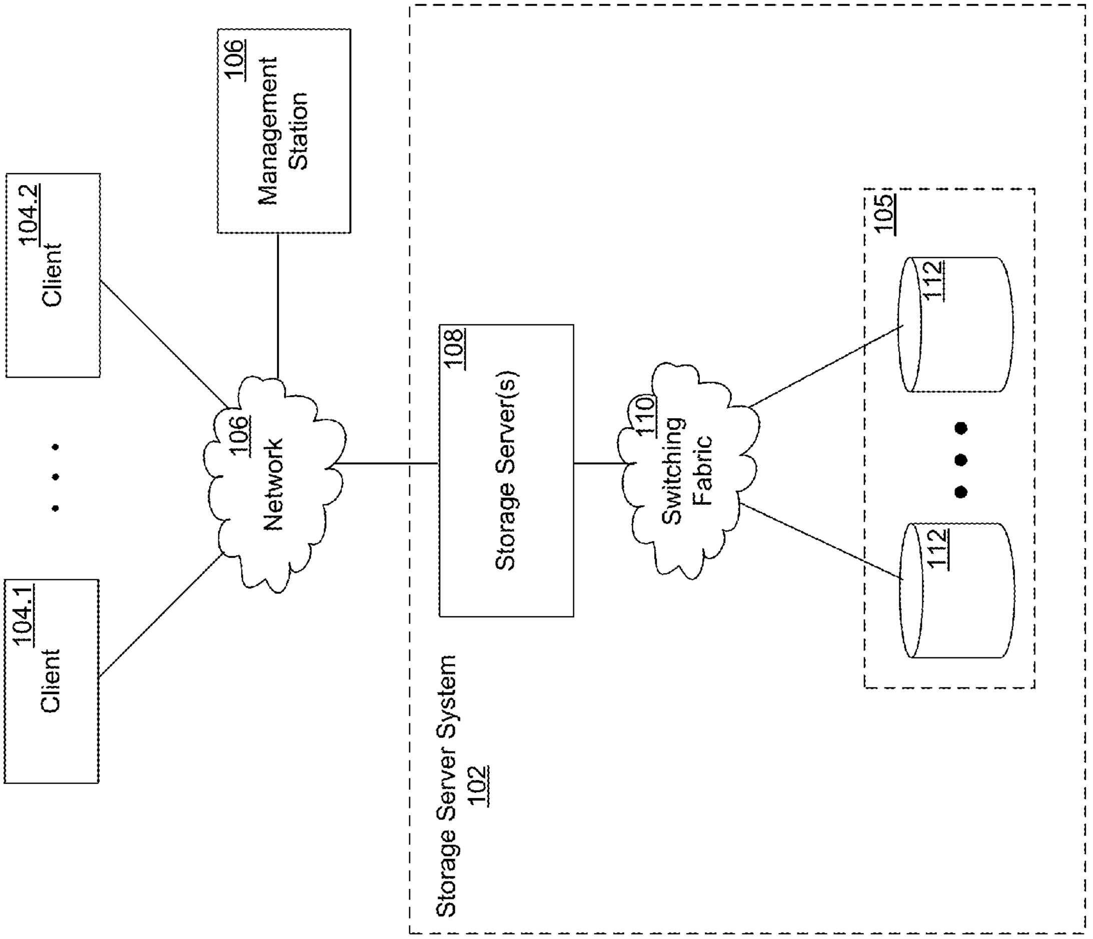
FIG. 1 illustrates a network storage environment in which the present invention can be implemented.
Figure 2:
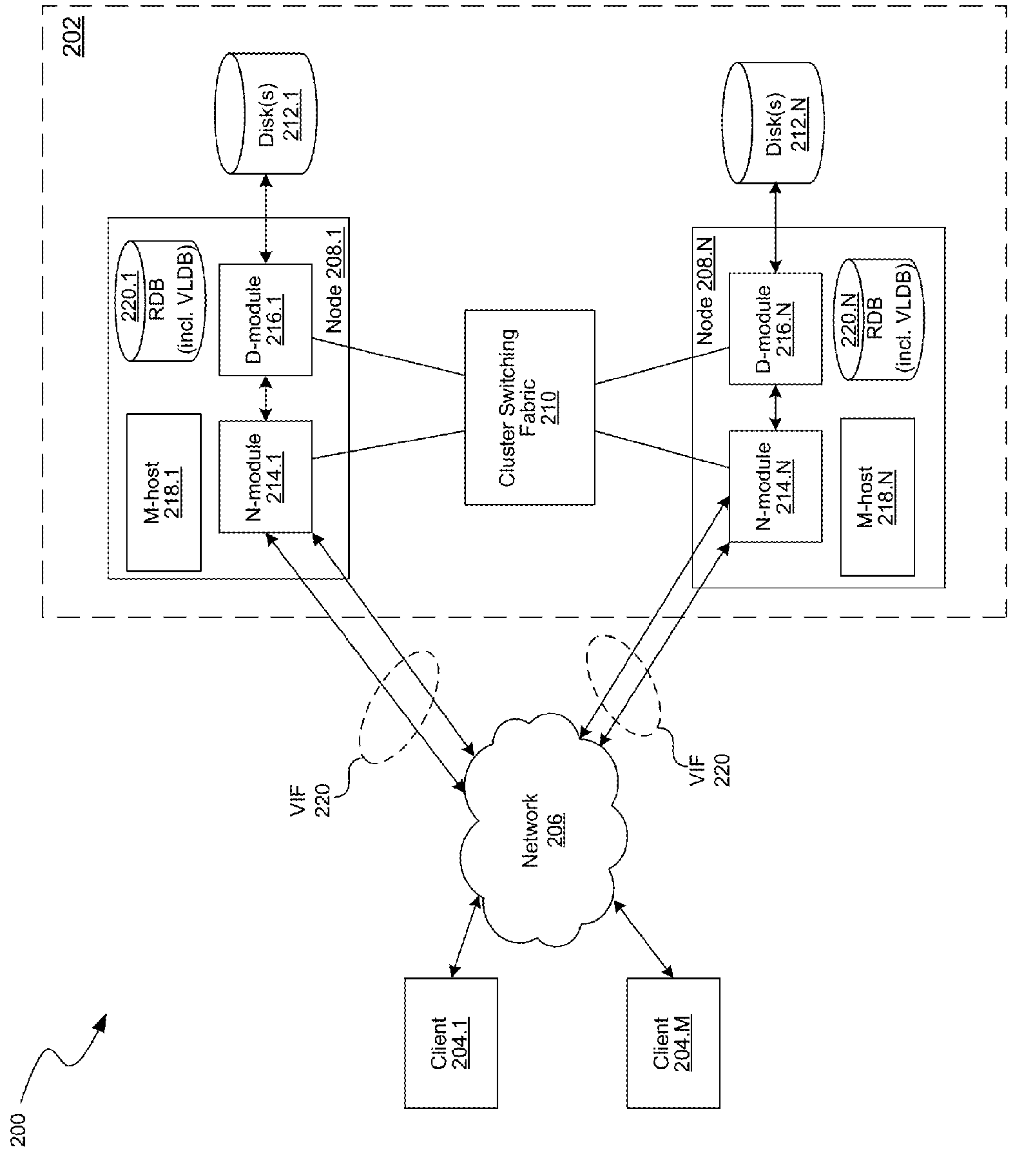
FIG. 2 illustrates a clustered network storage environment in which the present invention can be implemented.

FIGS. 1 and 2 show, at different levels of detail, a network configuration in which the techniques introduced here can be implemented. In particular, FIG. 1 shows a network data storage environment, which includes a plurality of client systems 104.1-104.2, a storage server system 102, and computer network 106 connecting the client systems 104.1-104.2 and the storage server system 102. As shown in FIG. 1, the storage server system 102 includes at least one storage server 108, a switching fabric 110, and a number of mass storage devices 112, such as disks, in a mass storage subsystem 105. Alternatively, some or all of the mass storage devices 212 can be other types of storage, such as flash memory, solid-state drives (SSDs), tape storage, etc.

The storage server (or servers) 108 may be, for example, one of the FAS-xxx family of storage server products available from NetApp, Inc. The client systems 104.1-104.2 are connected to the storage server 108 via the computer network 106, which can be a packet-switched network, for example, a local area network (LAN) or wide area network (WAN). Further, the storage server 108 is connected to the disks 112 via a switching fabric 110, which can be a fiber distributed data interface (FDDI) network, for example. It is noted that, within the network data storage environment, any other suitable numbers of storage servers and/or mass storage devices, and/or any other suitable network technologies, may be employed.

The storage server 108 can make some or all of the storage space on the disk(s) 112 available to the client systems 104.1-104.2 in a conventional manner. For example, each of the disks 112 can be implemented as an individual disk, multiple disks (e.g., a RAID group) or any other suitable mass storage device(s). The storage server 108 can communicate with the client systems 104.1-104.2 according to well-known protocols, such as the Network File System (NFS) protocol or the Common Internet File System (CIFS) protocol, to make data stored on the disks 112 available to users and/or application programs. The storage server 108 can present or export data stored on the disk 112 as volumes to each of the client systems 104.1-104.2. A "volume" is an abstraction of physical storage, combining one or more physical mass storage devices (e.g., disks) or parts thereof into a single logical storage object (the volume), and which is managed as a single administrative unit, such as a single file system. A "file system" is a structured (e.g., hierarchical) set of stored logical containers of data (e.g., volumes, logical unit numbers (LUNs), directories, files). Note that a "file system" does not have to include or be based on "files" per se as its units of data storage.

Various functions and configuration settings of the storage server 108 and the mass storage subsystem 105 can be controlled from a management station 106 coupled to the network 106. Among many other operations, a data object migration operation can be initiated from the management station 106.

FIG. 2 depicts a network data storage environment, which can represent a more detailed view of the environment in FIG. 1. The environment 200 includes a plurality of client systems 204 (204.1-204.M), a clustered storage server system 202, and a computer network 206 connecting the client systems 204 and the clustered storage server system 202. As shown in FIG. 2, the clustered storage server system 202 includes a plurality of server nodes 208 (208.1-208.N), a cluster switching fabric 210, and a plurality of mass storage devices 212

(212.1-212.N), which can be disks, as henceforth assumed here to facilitate description. Alternatively, some or all of the mass storage devices 212 can be other types of storage, such as flash memory, SSDs, tape storage, etc. Note that more than one mass storage device 212 can be associated with each node 208.

Each of the nodes 208 is configured to include several modules, including an N-module 214, a D-module 216, and an M-host 218 (each of which can be implemented by using a separate software module) and an instance of a replicated database (RDB) 220. Specifically, node 208.1 includes an N-module 214.1, a D-module 216.1, and an M-host 218.1; node 208.N includes an N-module 214.N, a D-module 216.N, and an M-host 218.N; and so forth. The N-modules 214.1-214.M include functionality that enables nodes 208.1-208.N, respectively, to connect to one or more of the client systems 204 over the network 206, while the D-modules 216.1-216.N provide access to the data stored on the disks 212.1-212.N, respectively. The M-hosts 218 provide management functions for the clustered storage server system 202. Accordingly, each of the server nodes 208 in the clustered storage server arrangement provides the functionality of a storage server.

The RDB 220 is a database that is replicated throughout the cluster, i.e., each node 208 includes an instance of the RDB 220. The various instances of the RDB 220 are updated regularly to bring them into synchronization with each other. The RDB 220 provides cluster-wide storage of various information used by all of the nodes 208, including a volume location database (VLDB) (not shown). The VLDB is a database that indicates the location within the cluster of each volume in the cluster (i.e., the owning D-module 216 for each volume) and is used by the N-modules 214 to identify the appropriate D-module 216 for any given volume to which access is requested.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Figure 3:
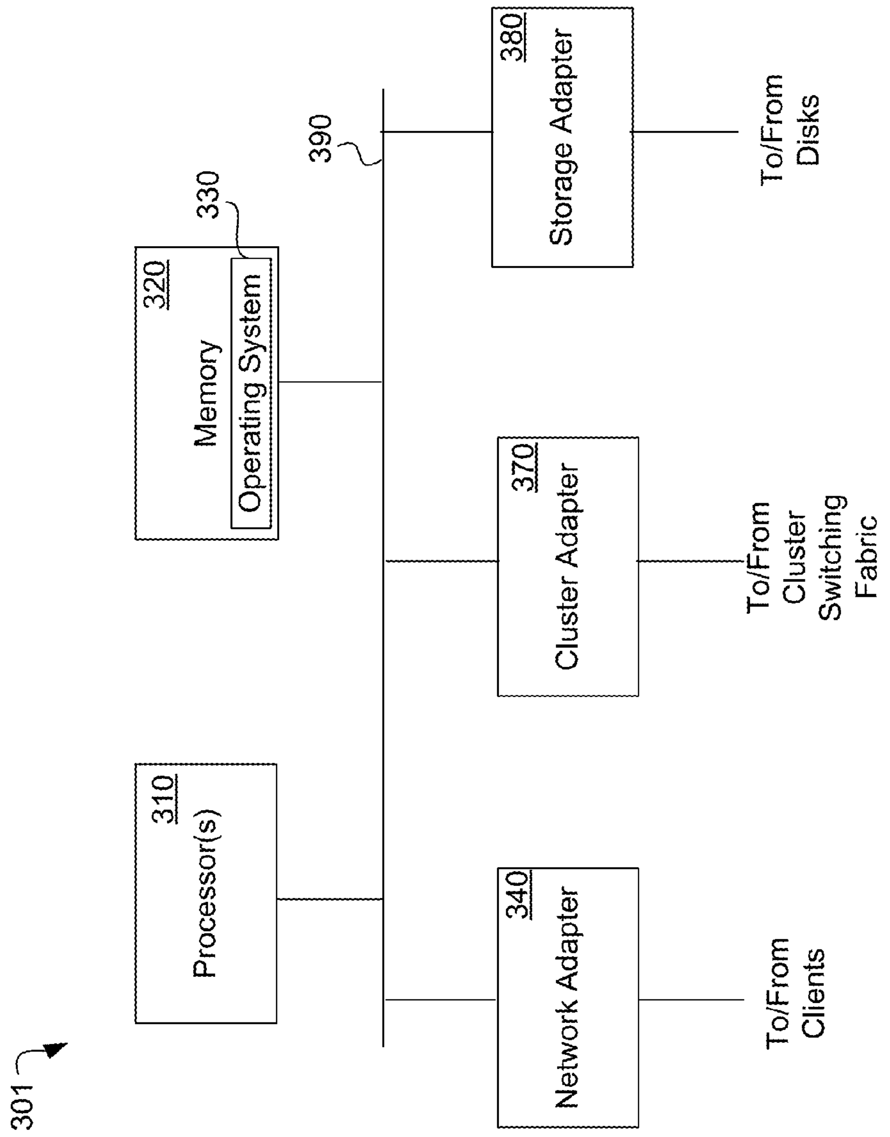
FIG. 3 is a high-level block diagram showing an example of the hardware architecture of a storage controller that can implement one or more storage server nodes.

FIG. 3 is a diagram illustrating an example of a storage controller that can implement one or more of the storage server nodes 208. In an exemplary embodiment, the storage controller 301 includes a processor subsystem that includes one or more processors. The storage controller 301 further includes a memory 320, a network adapter 340, a cluster access adapter 370 and a storage adapter 380, all interconnected by an interconnect 390. The cluster access adapter 370 includes a plurality of ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 270 is utilized by the N-module 214 and/or D-module 216 for communicating with other N-modules and/or D-modules of the cluster.

The storage controller 301 can be embodied as a single- or multi-processor storage system executing a storage operating system 330 that preferably implements a high-level module, such as a storage manager, to logically organize the information as a hierarchical structure of named directories, files and special types of files called virtual disks (hereinafter generally "blocks") on the disks. Illustratively, one processor 310 can execute the functions of the N-module 214 on the node 208 while another processor 310 executes the functions of the D-module 216.

The memory 320 illustratively comprises storage locations that are addressable by the processors and adapters 340, 370, 380 for storing software program code and data structures associated with the present invention. The processor 310 and adapters may, in turn, comprise processing elements and/or logic circuitry configured to execute the software code and manipulate the data structures. The storage operating system 330, portions of which is typically resident in memory and executed by the processors(s) 310, functionally organizes the storage controller 301 by (among other things) configuring the processor(s) 310 to invoke storage operations in support of the storage service provided by the node 208. It will be apparent to those skilled in the art that other processing and memory implementations, including various computer readable storage media, may be used for storing and executing program instructions pertaining to the technique introduced here.

The network adapter 340 includes a plurality of ports to couple the storage controller 301 to one or more clients 204 over point-to-point links, wide area networks, virtual private networks implemented over a public network (Internet) or a shared local area network. The network adapter 340 thus can include the mechanical, electrical and signaling circuitry needed to connect the storage controller 301 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 380 cooperates with the storage operating system 330 to access information requested by the clients 204. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks 212. The storage adapter 380 includes a plurality of ports having input/output (I/O) interface circuitry that couples to the disks over an I/O interconnect arrangement, such as a conventional high-performance, Fibre Channel (FC) link topology.

Storage of information on disks 212 can be implemented as one or more storage volumes that include a collection of physical storage disks cooperating to define an overall logical arrangement of volume block number (VBN) space on the volume(s). The disks 212 can be organized as a RAID group. One or more RAID groups together form an aggregate. An aggregate can contain one or more volumes/file systems.

The storage operating system 330 facilitates clients' access to data stored on the disks 212. In certain embodiments, the storage operating system 330 implements a write-anywhere file system that cooperates with one or more virtualization modules to "virtualize" the storage space provided by disks 212. In certain embodiments, a storage manager 460 (FIG. 4) logically organizes the information as a hierarchical structure of named directories and files on the disks 212. Each "on-disk" file may be implemented as set of disk blocks configured to store information, such as data, whereas the directory may be implemented as a specially formatted file in which names and links to other files and directories are stored. The virtualization module(s) allow the storage manager 460 to further logically organize information as a hierarchical structure of blocks on the disks that are exported as named logical unit numbers (LUNs).

In the illustrative embodiment, the storage operating system 330 is a version of the Data ONTAP® operating system available from NetApp, Inc. and the storage manager 460 implements the Write Anywhere File Layout (WAFL®) file system. However, other storage operating systems are capable of being enhanced or created for use in accordance with the principles described herein.

Figure 4:
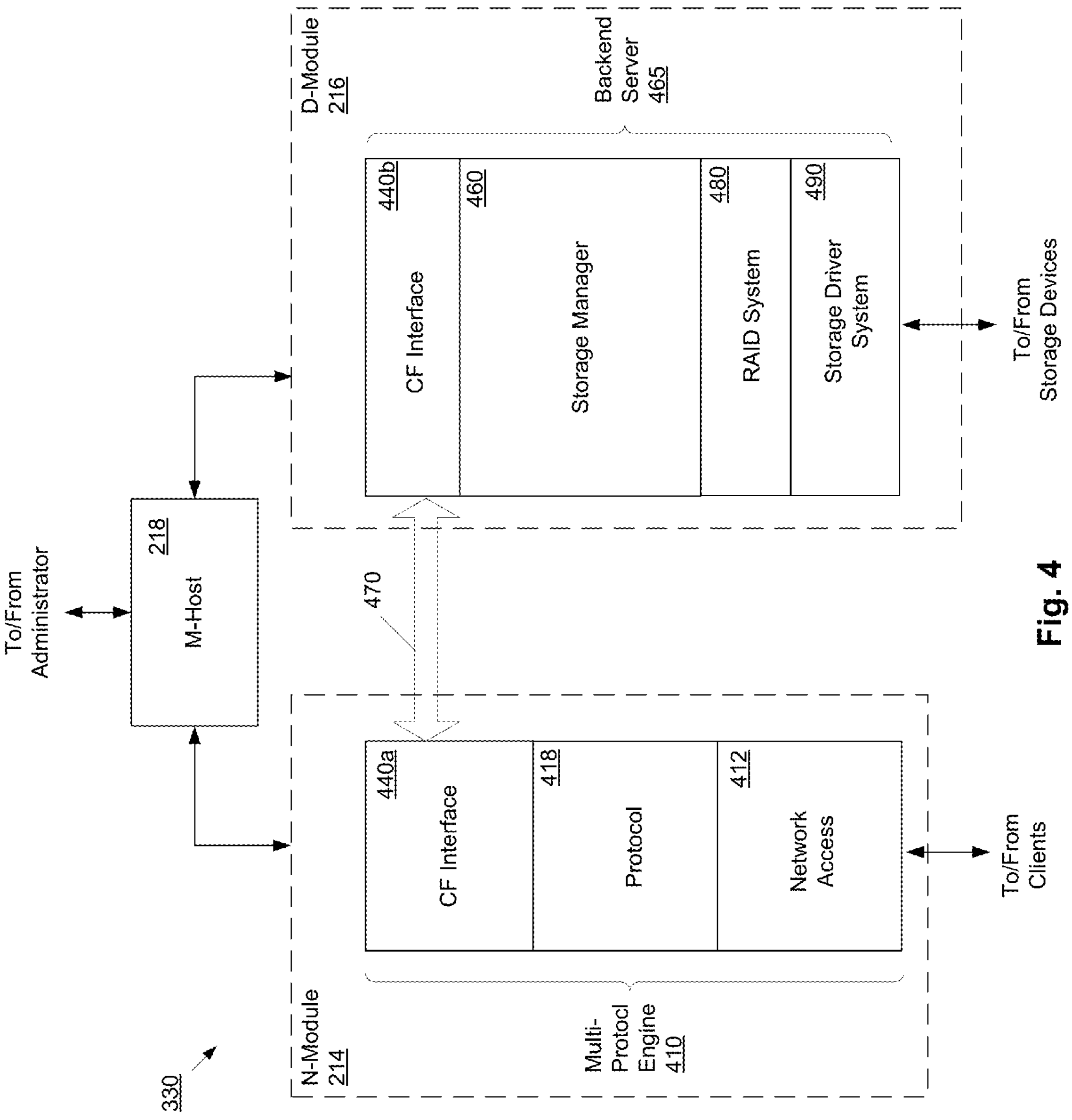
FIG. 4 illustrates an example of a storage operating system of a storage server node.

FIG. 4 is a diagram illustrating an example of storage operating system 330 that can be used with the technique introduced here. In the illustrated embodiment the storage operating system 330 includes multiple functional layers organized to form an integrated network protocol stack or, more generally, a multi-protocol engine 410 that provides data paths for clients to access information stored on the node using block and file access protocols. The multiprotocol engine 410 in combination with underlying processing hardware also forms the N-module 214. The multi-protocol engine 410 includes a network access layer 412 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 410 also includes a protocol layer which implements various higher-level network protocols, such as Network File System (NFS), Common Internet File System (CIFS), Hypertext Transfer Protocol (HTTP), Internet small computer system interface (iSCSI), etc. Further, the multiprotocol engine 410 includes a cluster fabric (CF) interface module 440*a* which implements intra-cluster communication with D-modules and with other N-modules.

In addition, the storage operating system 330 includes a set of layers organized to form a backend server 465 that provides data paths for accessing information stored on the disks 212 of the node 208. The backend server 465 in combination with underlying processing hardware also forms the D-module 216. To that end, the backend server 465 includes a storage manager module 460 that manages any number of volumes 472, a RAID system module 480 and a storage driver system module 490.

The storage manager 460 primarily manages a file system (or multiple file systems) and serves client-initiated read and write requests. The RAID system 480 manages the storage and retrieval of information to and from the volumes/disks in accordance with a RAID redundancy protocol, such as RAID-4, RAID-5, or RAID-DP, while the disk driver system 490 implements a disk access protocol such as SCSI protocol or FCP.

The backend server 465 also includes a CF interface module 440*b* to implement intra-cluster communication 470 with N-modules and/or other D-modules. The CF interface modules 440*a* and 440*b* can cooperate to provide a single file system image across all D-modules 216 in the cluster. Thus, any network port of an N-module 214 that receives a client request can access any data container within the single file system image located on any D-module 216 of the cluster.

The CF interface modules 440 implement the CF protocol to communicate file system commands among the modules of cluster over the cluster switching fabric 210 (FIG. 2). Such communication can be effected by a D-module exposing a CF application programming interface (API) to which an N-module (or another D-module) issues calls. To that end, a CF interface module 440 can be organized as a CF encoder/decoder. The CF encoder of, e.g., CF interface 440*a* on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 440*b* on D-module 216 de-encapsulates the CF message and processes the file system command.

In operation of a node 208, a request from a client 204 is forwarded as a packet over the network 206 and onto the node 208, where it is received at the network adapter 340 (FIG. 3). A network driver of layer 412 processes the packet and, if appropriate, passes it on to a network protocol and file access layer for additional processing prior to forwarding to the storage manager 460. At that point, the storage manager 460 generates operations to load (retrieve) the requested data from disk 212 if it is not resident in memory 320. If the information is not in memory 320, the storage manager 460 indexes into a metadata file to access an appropriate entry and retrieve a logical VBN. The storage manager 460 then passes a message structure including the logical VBN to the RAID system 480; the logical VBN is mapped to a disk identifier and disk block number (DBN) and sent to an appropriate driver (e.g., SCSI) of the disk driver system 490. The disk driver accesses the DBN from the specified disk 212 and loads the requested data block(s) in memory for processing by the node. Upon completion of the request, the node (and operating system) returns a reply to the client 204 over the network 206.

The data request/response "path" through the storage operating system 330 as described above can be implemented in general-purpose programmable hardware executing the storage operating system 330 as software or firmware. Alternatively, it can be implemented at least partially in specially designed hardware. That is, in an alternate embodiment of the invention, some or all of the storage operating system 330 is implemented as logic circuitry embodied within a field programmable gate array (FPGA) or an application specific integrated circuit (ASIC), for example.

The N-module 214 and D-module 216 each can be implemented as processing hardware configured by separately-scheduled processes of storage operating system 330; however, in an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism can be, for example, a generic file- and/or block-based "agnostic" CF protocol that comprises a collection of methods/functions constituting a CF API.

Overview of Content Repository

Figure 5:
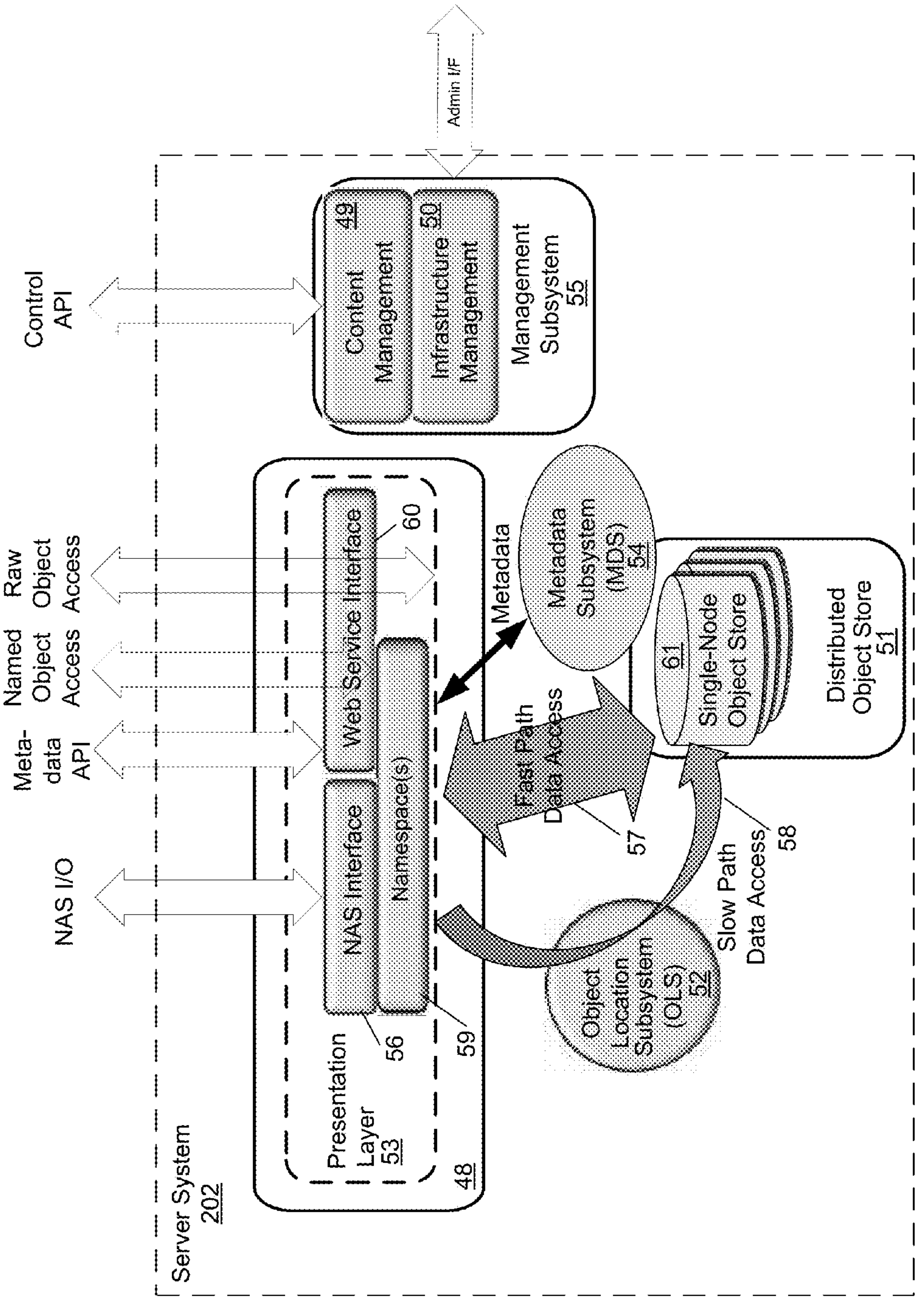
FIG. 5 illustrates the overall architecture of a content repository according to one embodiment.

The techniques introduced here generally relate to a content repository implemented in a network storage server system 202 such as described above. FIG. 5 illustrates the overall architecture of the content repository according to one embodiment. The major components of the content repository include a distributed object store 51, and object location subsystem (OLS) 52, a presentation layer 53, a metadata subsystem (MDS) 54 and a management subsystem 55. Normally there will be a single instance of each of these components in the overall content repository, and each of these components can be implemented in any one server node 208 or distributed across two or more server nodes 208. The functional elements of each of these units (i.e., the OLS 52, presentation layer 53, MDS 54 and management subsystem 55) can be implemented by specially designed circuitry, or by programmable circuitry programmed with software and/or firmware, or a combination thereof. The data storage elements of these units can be implemented using any known or convenient form or forms of data storage device.

The distributed object store 51 provides the actual data storage for all data objects in the server system 202 and includes multiple distinct single-node object stores 61. A "single-node" object store is an object store that is implemented entirely within one node. Each single-node object store 61 is a logical (non-physical) container of data, such as a volume or a logical unit (LUN). Some or all of the single-node object stores 61 that make up the distributed object store 51 can be implemented in separate server nodes 208. Alternatively, all of the single-node object stores 61 that make up the distributed object store 51 can be implemented in the same server node. Any given server node 208 can access multiple single-node object stores 61 and can include multiple single-node object stores 61.

The distributed object store provides location-independent addressing of data objects (i.e., data objects can be moved among single-node object stores 61 without changing the data objects' addressing), with the ability to span the object address space across other similar systems spread over geographic distances. Note that the distributed object store 51 has no namespace; the namespace for the server system 202 is provided by the presentation layer 53. A "namespace", as the term is used herein, is a mechanism for allowing end users or applications to name and organize data objects (which may, for example, provide hierarchical naming and/or organization of data, such as a directory/file structure).

The presentation layer 53 operates logically on top of the distributed object store 51 and provides multiple interfaces for accessing data stored in the object store 51, including a NAS interface and a Web Service interface. It is generated by at least one presentation module 48 (i.e., it may be generated collectively by multiple presentation modules 48, one in each multiple server nodes 208). A presentation module 48 can be in the form of specially designed circuitry, or programmable circuitry programmed with software and/or firmware, or a combination thereof.

The presentation layer 53 essentially functions as a router, by receiving client requests, translating them into an internal protocol and sending them to the appropriate D-module 216. The presentation layer 53 provides two or more independent interfaces for accessing stored data, e.g., a conventional NAS interface 56 and a Web Service interface 60. The NAS interface 56 allows access to the object store 51 via one or more conventional NAS protocols, such as NFS and/or CIFS. Thus, the NAS interface 56 provides a filesystem-like interface to the content repository.

The Web Service interface 60 allows access to data stored in the object store 51 via either "named object access" or "raw object access" (also called "flat object access"). Named object access uses a namespace (e.g., a filesystem-like directory-tree interface for accessing data objects), as does NAS access; whereas raw object access uses system-generated global object IDs to access data objects, as described further below. The Web Service interface 60 allows access to the object store 51 via Web Service (as defined by the W3C), using for example, a protocol such as Simple Object Access Protocol (SOAP) or a RESTful (REpresentational State Transfer-ful) protocol, over HTTP.

The presentation layer 53 further provides at least one namespace 59 for accessing data via the NAS interface or the Web Service interface. In one embodiment this includes a Portable Operating System Interface (POSIX) namespace. The NAS interface 56 allows access to data stored in the object store 51 via the namespace(s) 59. The Web Service interface 60 allows access to data stored in the object store 51 via either the namespace(s) 59 (by using named object access) or without using the namespace(s) 59 (by using "raw object access"). Thus, the Web Service interface 60 allows either named object access or raw object access; and while named object access is accomplished using a namespace 59, raw object access is not. Access by the presentation layer 53 to the object store 51 is via either a "fast path" 57 or a "slow path" 58, as discussed further below.

The function of the OLS 52 is to store and provide valid location IDs (and other information, such as policy IDs) of data objects, based on their global object IDs (these parameters are discussed further below). This is done, for example, when a client 204 requests access to a data object by using only the global object ID instead of a complete object handle including the location ID, or when the location ID within an object handle is no longer valid (e.g., because the target data object has been moved). Note that the system 202 thereby provides two distinct paths for accessing stored data, namely, a "fast path" 57 and a "slow path" 58. The fast path 57 provides data access when a valid location ID is provided by a client 204 (e.g., within an object handle). The slow path 58 makes use of the OLS and is used in all other instances of data access. The fast path 57 is so named because a target data object can be located directly from its (valid) location ID, whereas the slow path 58 is so named because it requires a number of additional steps (relative to the fast path) to determine the location of the target data object.

The MDS 54 is a subsystem for search and retrieval of stored data objects, based on metadata. It is accessed by users through the presentation layer 53. In general, the MDS 54 allows for "searchable storage" to be realized by way of metadata tagging. The MDS 54 stores data object metadata, which can include metadata specified by users, inferred metadata and/or system-generated metadata. The MDS 54 also allows data objects to be identified and retrieved by searching on any of that metadata. The metadata may be distributed across nodes in the system.

As an example of user-specified metadata, users of the system can create and associate various types of tags (e.g., key/value pairs) with data objects, based on which such objects can be searched and located. For example, a user can define a tag called "location" for digital photos, where the value of the tag (e.g., a character string) indicates where the photo was taken. As another example, digital music files can be assigned a tag called "mood", the value of which indicates the mood evoked by the music. System-defined metadata includes, for example, typical file attributes such as size, creation time, last modification time, last access time, owner, etc.

There are two types of inferred metadata: 1) latent and 2) system-generated. Latent inferred metadata is metadata in a data object which can be extracted automatically from the object and tagged on the object (examples include Genre, Album in an MP3 object, or Author, DocState in a Word document). System-generated inferred metadata is metadata generated by the server system 202 and includes working set information (e.g., access order information used for object prefetching), and object relationship information; these metadata are generated by the system to enable better "searching" via metadata queries (e.g., the system can track how many times an object has been accessed in the last week, month, year, and thus, allow a user to run a query, such as "Show me all of the JPEG images I have looked at in the last month").

The MDS 54 includes logic to allow users to associate a tag-value pair with an object and logic that provides two data object retrieval mechanisms. The first retrieval mechanism involves querying the metadata store for objects matching a user-specified search criterion or criteria, and the second involves accessing the value of a tag that was earlier associated with a specific object. The first retrieval mechanism, called a query, can potentially return multiple object handles, while the second retrieval mechanism, called a lookup, deals with a specific object handle of interest.

The management subsystem 55 includes a content management component 49 and an infrastructure management component 50. The infrastructure management component 50 includes logic to allow an administrative user to manage the storage infrastructure (e.g., configuration of nodes, disks, volumes, LUNs, etc.). The content management component 49 is a policy based data management subsystem for managing the lifecycle of data objects (and optionally the metadata) stored in the content repository, based on user-specified policies or policies derived from user-defined service-level objectives (SLOs), i.e., a more general specification of the end user's expected performance, data protection, security, etc. It can execute actions to enforce defined policies in response to system-defined trigger events and/or user-defined trigger events (e.g., attempted creation, deletion, access or migration of an object). Trigger events do not have to be based on user actions.

The specified policies may relate to, for example, system performance, data protection and data security. Performance related policies may relate to, for example, which logical container a given data object should be placed in, migrated from or to, when the data object should be migrated or deleted, etc. Data protection policies may relate to, for example, data backup and/or data deletion. Data security policies may relate to, for example, when and how data should be encrypted, who has access to particular data, etc. The specified policies can also include polices for power management, storage efficiency, data retention, and deletion criteria. The policies can be specified in any known, convenient or desirable format and method. A "policy" in this context is not necessarily an explicit specification by a user of where to store what data, when to move data, etc. Rather, a "policy" can be a set of specific rules regarding where to store what, when to migrate data, etc., derived by the system from the end user's SLOs, i.e., a more general specification of the end user's expected performance, data protection, security, etc. For example, an administrative user might simply specify a range of performance that can be tolerated with respect to a particular parameter, and in response the management subsystem 55 would identify the appropriate data objects that need to be migrated, where they should get migrated to, and how quickly they need to be migrated.

The content management component 49 uses the metadata tracked by the MDS 54 to determine which objects to act upon (e.g., move, delete, replicate, encrypt, compress). Such metadata may include user-specified metadata and/or system-generated metadata. The content management component 49 includes logic to allow users to define policies and logic to execute/apply those policies.

Figure 6:
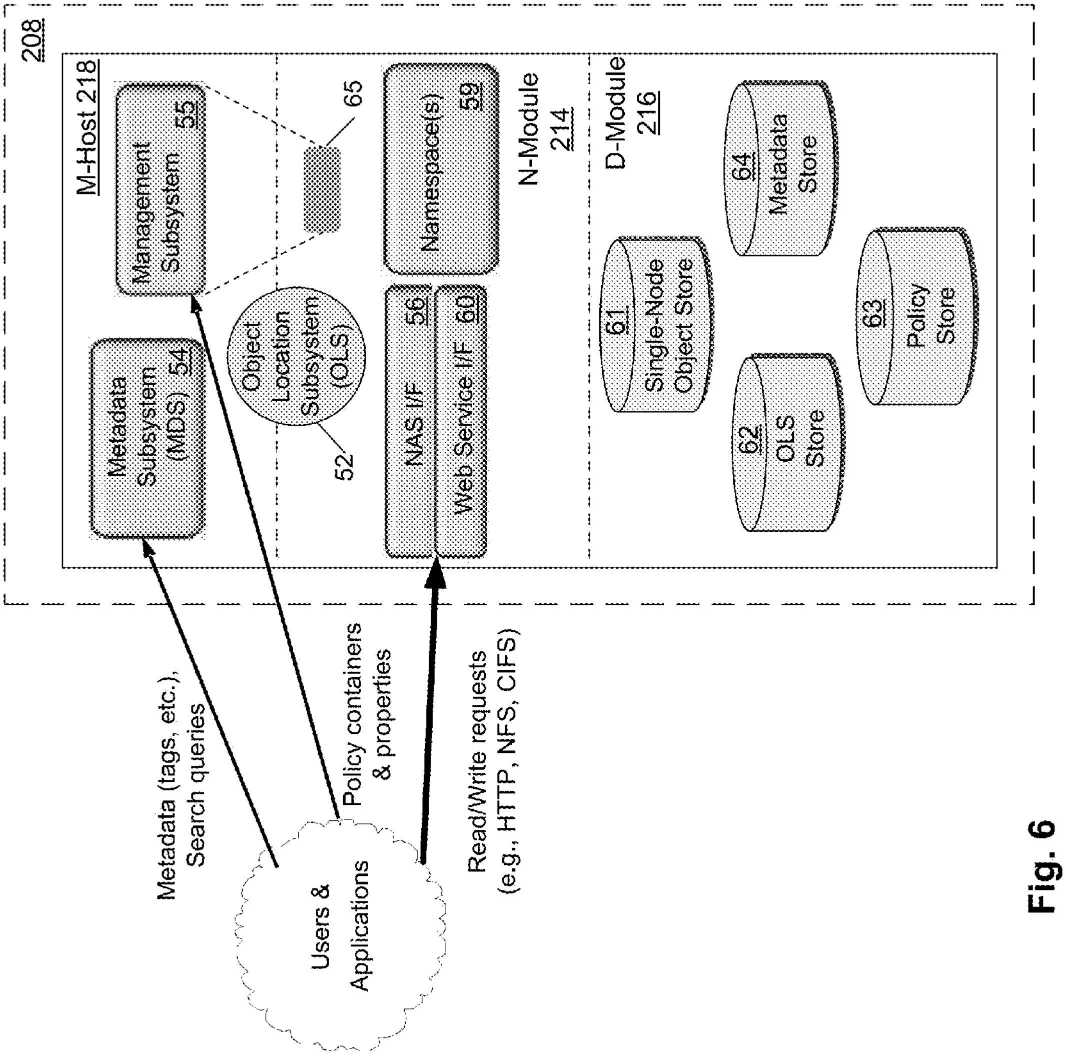
FIG. 6 illustrates how a content repository can be implemented in the clustered architecture of FIGS. 2 through 4.

FIG. 6 illustrates an example of how the content repository can be implemented relative to the clustered architecture in FIGS. 2 through 4. Although FIG. 6 illustrates the system relative to a single server node 208, it will be recognized that the configuration shown on the right side of FIG. 6 actually can be implemented by two or more (or all) of the server nodes 208 in a cluster.

In one embodiment, the distributed object store 51 is implemented by providing at least one single-node object store 61 in each of at least two D-modules 216 in the system (any given D-module 216 can include zero or more single node object stores 61). Also implemented in each of at least two D-modules 216 in the system are: an OLS store 62 that contains mapping data structures used by the OLS 52 including valid location IDs and policy IDs; a policy store 63 (e.g., a database) that contains user-specified policies relating to data objects (note that at least some policies or policy information may also be cached in the N-module 214 to improve performance); and a metadata store 64 that contains metadata used by the MDS 54, including user-specified object tags. In practice, the metadata store 64 may be combined with, or implemented as a part of, the single node object store 61.

The presentation layer 53 is implemented at least partially within each N-module 214. In one embodiment, the OLS 52 is implemented partially by the N-module 214 and partially by the corresponding M-host 218, as illustrated in FIG. 6. More specifically, in one embodiment the functions of the OLS 52 are implemented by a special daemon in the M-host 218 and by the presentation layer 53 in the N-module 214.

In one embodiment, the MDS 54 and management subsystem 55 are both implemented at least partially within each M-host 218. Nonetheless, in some embodiments, any of these subsystems may also be implemented at least partially within other modules. For example, at least a portion of the content management component 49 of the management subsystem 55 can be implemented within one or more N-modules 214 to allow, for example, caching of policies in such N-modules and/or execution/application of policies by such N-module(s). In that case, the processing logic and state information for executing/applying policies may be contained in one or more N-modules 214, while processing logic and state information for managing policies is stored in one or more M-hosts 218. As another example, at least a portion of the MDS 54 may be implemented within one or more D-modules 216, to allow it more efficiently to access system generated metadata generated within those modules.

Administrative users can specify policies for use by the management subsystem 55, via a user interface provided by the M-host 218 to access the management subsystem 55. Further, via a user interface provided by the M-host 218 to access the MDS 54, end users can assign metadata tags to data objects, where such tags can be in the form of key/value pairs. Such tags and other metadata can then be searched by the MDS 54 in response to user-specified queries, to locate or allow specified actions to be performed on data objects that meet user-specified criteria. Search queries received by the MDS 54 are applied by the MDS 54 to the single node object store 61 in the appropriate D-module(s) 216.

Distributed Object Store

Figure 7:
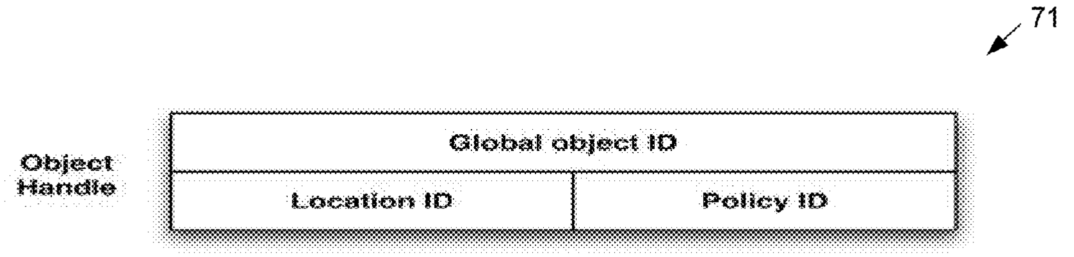
FIG. 7 illustrates a multilevel object handle.

As noted above, the distributed object store enables both path-based access to data objects as well as direct access to data objects. For purposes of direct access, the distributed object store uses a multilevel object handle, as illustrated in FIG. 7. When a client 204 creates a data object, it receives an object handle 71 as the response to creating the object. This is similar to a file handle that is returned when a file is created in a traditional storage system. The first level of the object handle is a system-generated globally unique number, called a global object ID, that is permanently attached to the created data object. The second level of the object handle is a "hint" which includes the location ID of the data object and, in the illustrated embodiment, the policy ID of the data object. Clients 204 can store this object handle 71, containing the global object ID location ID and policy ID.

When a client 204 attempts to read or write the data object using the direct access approach, the client includes the object handle of the object in its read or write request to the server system 202. The server system 202 first attempts to use the location ID (within the object handle), which is intended to be a pointer to the exact location within a volume where the data object is stored. In the common case, this operation succeeds and the object is read/written. This sequence is the "fast path" 57 for I/O (see FIG. 5).

If, however, an object is moved from one location to another (for example, from one volume to another), the server system 202 creates a new location ID for the object. In that case, the old location ID becomes stale (invalid). The client may not be notified that the object has been moved or that the location ID is stale and may not receive the new location ID for the object, at least until the client subsequently attempts to access that data object (e.g., by providing an object handle with an invalid location ID). Or, the client may be notified but may not be able or configured to accept or understand the notification.

The current mapping from global object ID to location ID is always stored reliably in the OLS 52. If, during fast path I/O, the server system 202 discovers that the target data object no longer exists at the location pointed to by the provided location ID, this means that the object must have been either deleted or moved. Therefore, at that point the server system 202 will invoke the OLS 52 to determine the new (valid) location ID for the target object. The server system 202 then uses the new location ID to read/write the target object. At the same time, the server system 202 invalidates the old location ID and returns a new object handle to the client that contains the unchanged and unique global object ID, as well as the new location ID. This process enables clients to transparently adapt to objects that move from one location to another (for example in response to a change in policy).

An enhancement of this technique is for a client 204 never to have to be concerned with refreshing the object handle when the location ID changes. In this case, the server system 202 is responsible for mapping the unchanging global object id to location ID. This can be done efficiently by compactly storing the mapping from global object ID to location ID in, for example, cache memory of one or more N-modules 214.

Figure 8:
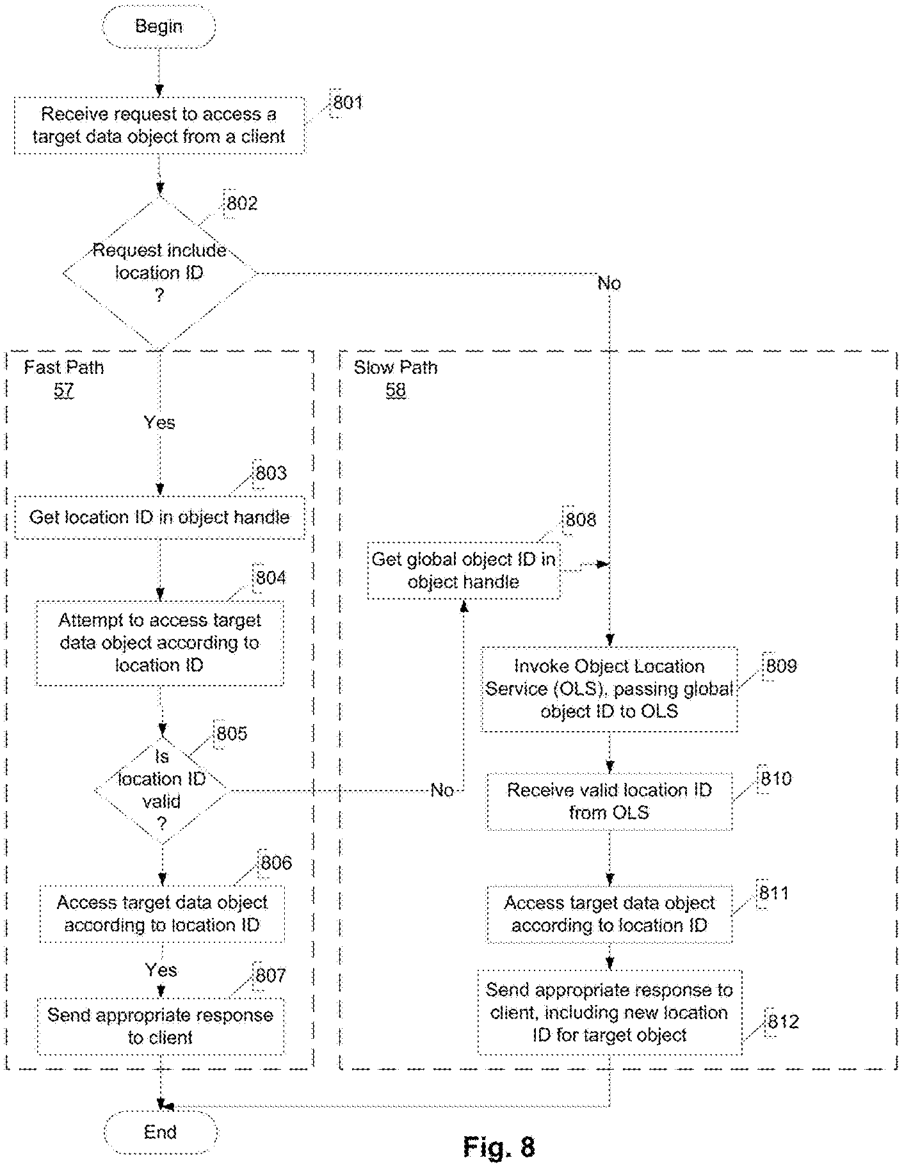
FIG. 8 is a flow diagram showing an example of the overall process by which a distributed object store services a data access request from a client.

Refer now to FIG. 8, which shows an example of the overall process by which the distributed object store services a data access request from a client 204. Initially, at 801 the server system 202 receives from a client 204 a request to access the target data object (e.g., a read or write request). The request at least includes a global object ID for the target data object. The server system 202 then determines at 802 whether the request includes a location ID (as noted above, in some instances a client may provide only the global object ID with the request). If the request includes a location ID, then the process proceeds with the fast path I/O, i.e., to operation 803; otherwise, the process proceeds with the slow path, to operation 808.

At 803 the distributed object store gets the location ID in the provided object handle. Next, at 804 the server system 202 attempts to access the target data object according to that location ID. Part of attempting to access the data object is determining whether the location ID provided in the object handle is valid.

In one embodiment this is accomplished by examining a flag in metadata of the target object, where such flag is set whenever the object is deleted or moved. For example, such a flag may exist in an inode representing the target object. If the object has been deleted or moved, the location ID will be invalid.

In this regard, note that the location ID maps to an internal file handle, which includes a number of fields. Once a D-module 216 receives a file handle, it can determine by looking at these fields whether the file handle is recent. The two relevant fields in this regard are the file ID (or inode number) and the generation number. The file ID (or inode number) can be used to determine if an inode for the target data object exists (and so, whether the data object itself exists), and the generation number can be used to determine whether the file handle refers to the correct version of the data object. The file ID (or inode number) maps to the data object's inode, and the generation number is a counter stored within the inode. Whenever the inode is reused (e.g., the previous data object is deleted and a new one is created), the generation number within the inode is incremented. This allows a D-module 216 (and, more specifically, its storage manager 460) to detect access to a valid inode with an invalid generation number. Once this occurs the storage manager 460 in the D-module 216 returns a "Stale file handle" error, which triggers an "Invalid Location ID" error. Thus, the file ID can be used to determine if an inode for the target data object exists (and so, whether the data object itself exists) and the generation number can be used to determine whether the file handle refers to the correct version of the data object. If one of these is not valid, an "Invalid Location ID" error is returned and can be used to trigger access the OLS 52 to get an updated location ID.

Referring still to FIG. 8, if the location ID in the object handle is valid (805), then at 806 the server system 202 accesses the target data object according to that location ID. The server system 202 then sends an appropriate response to the client at 807 (e.g., including the requested data in the case of a read or a confirmation in the case or write), and the process then ends.

If the location ID was not valid (805), then the process branches to the slow path, proceeding to operation 808. At 808 the server system 202 gets the global object ID from the object handle provided by the client. At 809 the server system 202 invokes the OLS 52, passing the global object ID to the OLS 52. The OLS 52 then determines and returns the valid location ID for the target data object at 810, in a manner which is described below. The server system 202 then accesses the target data object at 811 according to the valid location ID, and at 812 the server system 202 sends an appropriate response to the client, including the new (valid) location ID for the target object. The process then ends.

Referring again to 802, if the request from the client did not include a location ID, the system uses the slow path, proceeding to 809 as described above.

As noted above, an object handle can contain a policy ID to support inline policy management (i.e., policy management within the normal I/O path), which allows fast execution of policies. When a data object is created, the create function can also specify the policy or set of policies that needs to be applied on the object. Examples of such a policy (expressed here in natural language for simplicity) include "replicate an object twice", "compress the object after storing it", and "store the object on cheap, low-power disks". One or more such policies can be represented by a policy ID.

Each time during an object read/write or delete, the server system 202 uses the policy ID encoded in the object handle to quickly look up in the policy store the action that needs to be taken. For example, if the policy states "do not delete this file until 2015", a delete operation will fail until after that year. If for some reason a policy ID cannot be specified (as may be the case with certain protocols, such as NFS or CIFS), a default policy or a policy based on the data object's location or type can be applied.

Object Location Subsystem (OLS)

The OLS 52 is a mechanism the primary purpose of which is to allow a valid location ID of a data object to be determined from the object's global object ID. However, the OLS 52 also allows the policy ID and/or any other metadata associated with a data object to be identified in essentially the same way. An example of how this can be implemented is described now with reference to FIG. 9.

Figure 9:
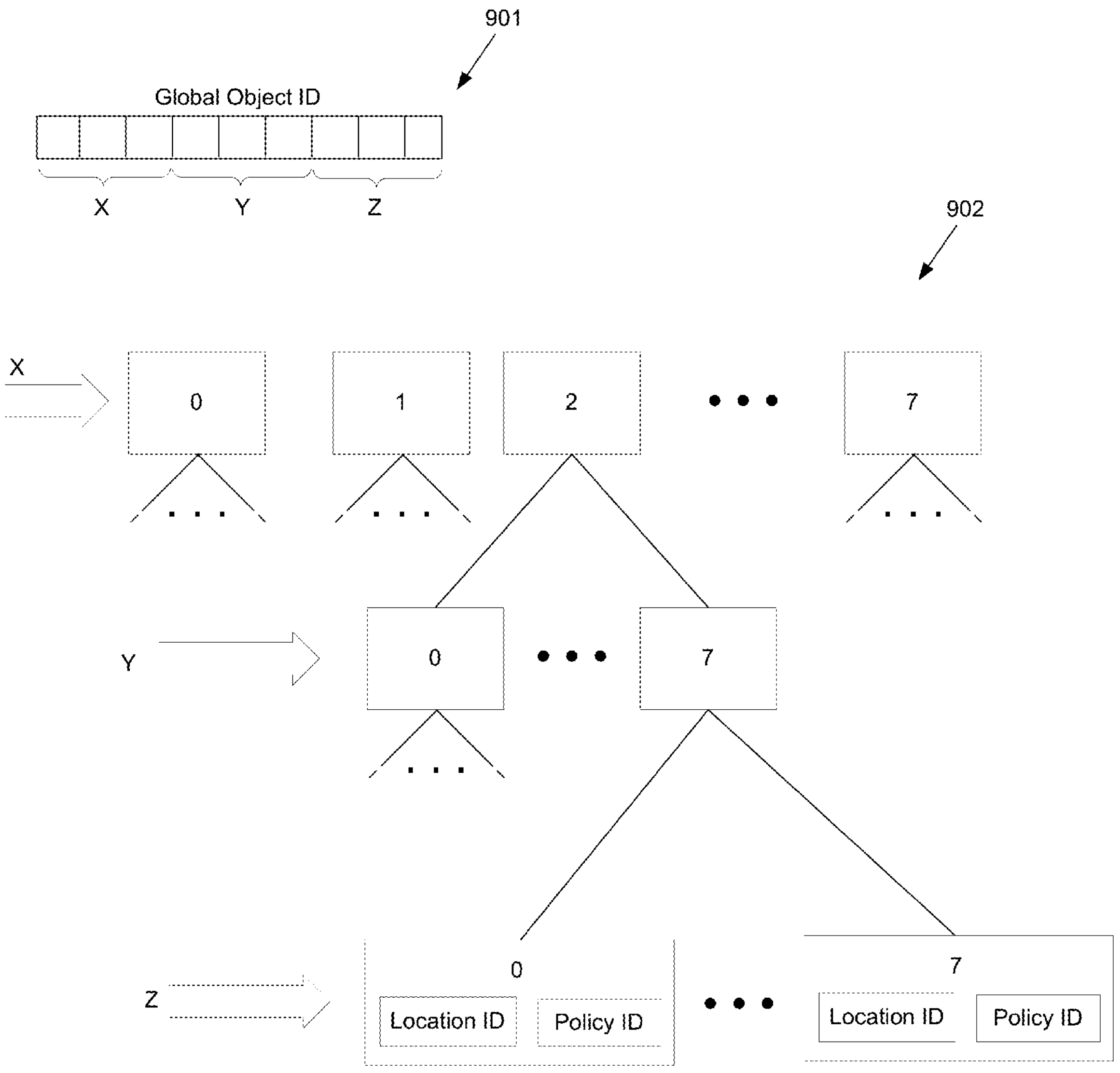
FIG. 9 illustrates how the OLS can use a mapping structure to map a global object ID of an object to a corresponding location ID and policy ID.

In one embodiment, each global object ID used by the server system 202 is a multi-bit entity which is logically divided into multiple segments. Each segment includes at least one bit and typically includes multiple bits. In the example of FIG. 9, a global object ID 901 is a nine-bit value, which is divided into three segments, X, Y and Z, each of which includes three bits. A first segment X represents the three most significant bits of the global object ID, a second segment Y represents the next most significant bits of the global object ID, and segment Z represents the three least significant bits of the global object ID. These particular numbers of bits and segments are used here only to facilitate description; for any given system, the number of segments and bits in a global object ID can be chosen to accommodate the system's anticipated storage needs (i.e., a greater number of segments/bits allows a greater number of data objects to be represented).

The OLS 52 includes a mapping data structure 902 (which can be stored in the OLS store 62 in FIG. 6) that maps global object IDs to their corresponding location IDs and policy IDs (and/or any other metadata that may be associated with a data object). Each predefined segment of the global object ID is used to index into a different level of the mapping data structure 902. In the example of FIG. 9, each three-bit segment of the global object ID can have eight possible values, e.g., 0, 1, 2, . . . , 7, and therefore, can represent eight different entries within a given level of the mapping data structure 902. For example, the value of segment X is used to select the appropriate entry in the top level of the mapping data structure 902, the value of segment Y is used to select the appropriate entry in the next lower level of the mapping data structure 902, and the value of segment Z is used to select the appropriate entry in the lowest level of the mapping data structure 902. The selected entry in the lowest level contains the current (valid) location ID and policy ID of the global object ID 901. In this way, the OLS enables the current location ID, policy ID and/or any other metadata associated with a data object to be easily located based on the global object ID of the object.

In one embodiment, each node in the structure depicted in FIG. 9 is a directory in a file system, and the traversal of the tree structure is accomplished by a conventional directory traversal operation performed by the storage manager 460 (FIG. 4) of a D-module 216. In another embodiment, the leaf nodes can contain multiple mappings instead of just one. In that case, the entries in each leaf node have the form <object id least significant bits>:<location ID, policy ID>. That is, the "remaining" least significant bits of the object ID that were not used in the directory traversal to locate the leaf node are used as the lookup key in the directory that is the leaf node.

These nodes (both the leaves and the internal nodes) can reside on any storage container on any D-module 216 in the system. The use of a global namespace in the storage cluster allows the "stitching" of these nodes into a single tree that can be traversed using standard directory tree traversal. By spreading the tree across multiple D-modules 216, the performance of the OLS 52 can be scaled out, and we can avoid the OLS 52 becoming a centralized bottleneck.

Note also that the OLS tree can be populated "on demand" as objects are created that "fall" into specific areas of the tree. This approach represents a trade-off between space and time, i.e., the space consumed for storing potentially unused sections of the tree versus the increased latency of creating objects due to having to create these OLS nodes in line during object creation.

As noted above, the server system 202 logically separates path names from object handles. In a traditional storage system, a file is represented by a path such as "/u/foo/bar/file.doc". In this example, "u" is a directory under the root directory "/", "foo" is a directory under "u", and so on. Each component in this path gets mapped to a specific handle that identifies a specific storage location on a specific storage device. Therefore, the entire path name maps to a specific location, making it very difficult to move files around without having to rename them.

The multi-level object handle technique introduced here allows the server system 202 to break the tight relationship between path names and location that is characteristic of conventional storage systems. In one embodiment, path names in the server system 202 are stored in a POSIX namespace 59 (FIG. 5), which is maintained by the presentation layer 53 and is independent of actual locations of objects. The POSIX namespace 59 includes a data structure for mapping path names to corresponding global object IDs. By using this mapping in conjunction with the OLS 52 (i.e., by mapping path name to global object ID and then mapping global object ID to location ID), the server system 202 can mimic a traditional filesystem hierarchy. In certain embodiments the global object ID is stored within the object handle presented by the NAS protocol, thus avoiding a need to lookup the mapping on every access.

The POSIX namespace 59 together with the OLS 52 thereby provides a layer of indirection between (i.e., provides a logical separation of) path names of stored data objects and the storage locations of the data objects, and also provides a layer of indirection between object identifiers of the stored data objects and the storage locations of the data objects. This separation facilitates transparent migration (i.e., an object can be moved without affecting its name), and moreover, it enables any particular data object to be represented by multiple paths names, thereby facilitating navigation. In particular, this allows the implementation of a hierarchical protocol such as NFS on top of an object store, while at the same time maintaining the ability to do transparent migration. For example, when an object is moved to a new location, all that is necessary is update its OLS mapping to point to the new location. After that, subsequent requests by path name are carried out by mapping the existing path name to the existing global object ID and then mapping that global object ID to the new location ID.

Metadata Subsystem (MDS)

As explained below, the MDS described herein provides various advantageous features, including:

1) The ability to manage a wide range of metadata, from metadata sparsely applied to few objects in the content repository to metadata applied to all objects in the content repository.

2) Layout of metadata on a node in a manner which is efficient for both metadata updates and metadata queries.

3) Efficient metadata distribution across nodes in a cluster to minimize cross-node communication.

4) Distributed execution of multi-predicate metadata queries.

Each item of metadata is an attribute-value pair. Each metadata item is stored on one storage node, which may be the node on which the related data object is stored; this approach reduces the need for cross-node communications in servicing metadata updates and queries. Metadata can also be distributed across different storage tiers based on, for example, application- or user-defined policies. In one embodiment, all metadata items for an object are stored in the same storage node of the cluster.

The MDS 54 stores and manages metadata by implementing "query domains". A query domain (or simply "domain") is a logical construct used to provide isolation of metadata belonging to different operational contexts (e.g., different users or applications), for purposes such as authorization and access control. Each metadata item can be assigned to a particular query domain. Every metadata operation is performed within the context of a specified query domain.

Figure 10:
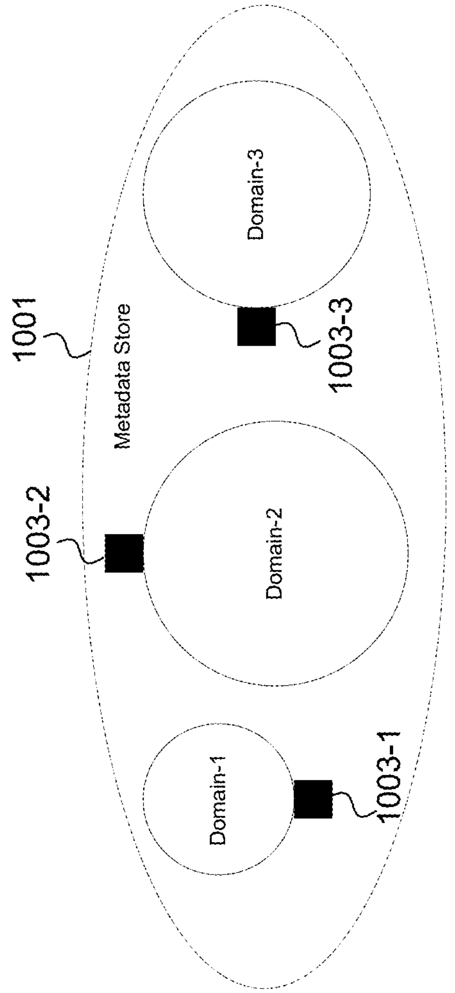
FIG. 10 illustrates the use of query domains.

The domain concept is illustrated in FIG. 10, in which the dashed-line ellipse 1001 represents all of the metadata stored in a given network storage system. Each circle represents a separate domain, e.g., Domain-1, Domain-2 or Domain-3, where each domain has its own set of domain attributes, 1003-1, 1003-2 or 1003-3, respectively. Domain attributes can include a fixed schema definition, selective attributes on which to index, authentication context, access control, etc. Note that a "domain" is a cluster-wide entity and is not restricted to a single node.

A query domain is typically created by an application. However, some domains are owned by the system itself (e.g., a System Metadata Domain). Thus, in one embodiment there are essentially two types of domains used by the MDS 54, application-created domains and a System Metadata Domain. The System Metadata Domain is created by default and includes system metadata. Application-created domains are created by and for application contexts. Thus, when an application specifies the creation of a domain, it may also specify an initial schema for that domain (i.e., a set of metadata attributes).

A query domain is typically created at runtime. An application can create a domain using, for example, HTTP and specifying a command, "CreateDomain". The command specifies a domain name, optionally an initial schema specification for the domain, and optionally an access control specification. A domain identifier is returned upon successful creation of the domain. The parameters are the same regardless of the location from which the CreateDomain operation is requested. Every domain has its own ownership and access control specification. A domain can also be created by an application running on an M-host and using the MDS 54. In that case, the application can use the client interface for a Create Domain method.

In certain embodiments, each node 208 of the storage system implements a separate, substantially identical instance of the MDS 54. These instances of the MDS can collectively implement any query domain.

As mentioned above, there are three main types of metadata: user-defined, inferred, and system-generated. These types of metadata are generated in the following manner.

User-defined metadata is specified by a user of a client device. For inferred-latent metadata, an application (typically executing in an M-host) which knows the format of the data object in question reads the metadata form the data object and applies the metadata onto the object through the MDS interface (typically using a client-library of MDS). For system-generated metadata, an application periodically scans the constituent data volumes in the system to get the changed information since it last ran. It then populates this information into the MDS 54.

There are two types of inferred metadata: latent and discovered. Inferred-discovered metadata can be discovered, for example, from an object's content, access times, or other metadata. For example, an application can periodically scan the constituent data volumes in the system and analyze the objects' content. Using that object content information, the application can build an association of one object with another. It does this by writing metadata to both objects, providing linkage information (e.g., the OID) of the other object. As another example, inferred-discovered metadata could be discovered by using the access times of an object to determine locality of access.

The process flows for managing all of these types of metadata are the same from a user's perspective, i.e., the same user interface is used and the behavior is identical. The flows are also the same for one MDS service instance on one node interacting with another instance on another node.

The most significant metadata operations that the MDS 54 performs are the following: attaching metadata to a data object (SET-ATTRS), getting the currently attached attributes a data object (GET-ATTRS), getting the value associated with one or more identified attributes (GET-ATTR-VAL), removing metadata (REMOVE-ATTRS), removing all information about an OID from the MDS 54 (DESTROY-ATTRS). Another possible metadata operation is replication, as discussed below. All of these operations specify a domain ID and the OID of the data object on which they are intended to act.

Additionally, when the user needs to locate the data object or objects that meet a specified criterion or criteria but does not know the OID of those objects, a metadata query is used. Like other metadata operations, a query is performed within the context of a query domain (hereinafter simply "domain"). In one embodiment a query has a predicate of the type: <attr-name> <relational-op> <attr-val>. An example is "Author==gmakkar". Examples of the relational operators that can be supported are: equality (==), less-than (<), less-than-or-equal (<=), greater-than (>), greater-than-or-equal (>=), range (e.g., between two values), and prefix (applicable to strings). Predicates can be combined using Boolean operators by using the generic form: <predicate-1> <bool-op> <predicate-2>. A more concrete example is "Author==gmakkar" AND "DocType==PDF" AND "Date range 01-01-2009, 01-01-2010". In this way, search queries for metadata can be multi-predicate queries.

Query Results are cached at the MDS serving instances and can be persisted there, if requested by the client. This allows a user to browse or manipulate a cached (snapshot) set of query results while the underlying metadata store may be changing. Note that certain nodes in a cluster may contain no metadata. The MDS instance in a node which contains no metadata acts merely as a router for routing metadata operation requests and results to or from MDS instances in other nodes; such instances are referred to herein as "MDS routing instances". In contrast, MDS instances which serve or manage metadata are referred to as "MDS serving instances". The process flows for a query and other metadata operations are described below.

This MDS 54 allows different data objects to have different metadata attributes, and to have different numbers of metadata attributes. Consequently, the MDS 54 can manage a wide range of metadata applicability, ranging from certain metadata sparsely applied to only few objects in the content repository ("sparsely populated" metadata), to other metadata (potentially) applied to all objects in the content repository ("fully populated" metadata). Furthermore, the system allows typed metadata attributes, i.e., metadata attributes which have a data type associated with them, such as text, integer, opaque, etc. In one embodiment, a type for an attribute is specified by the user when the attribute is first created and remains for the lifetime of that attribute (this characteristic is called being "strongly typed", i.e., where an attribute's type does not change over the lifetime of the attribute). If the attribute is destroyed, it may subsequently be re-created with a different type association.

Figure 11:
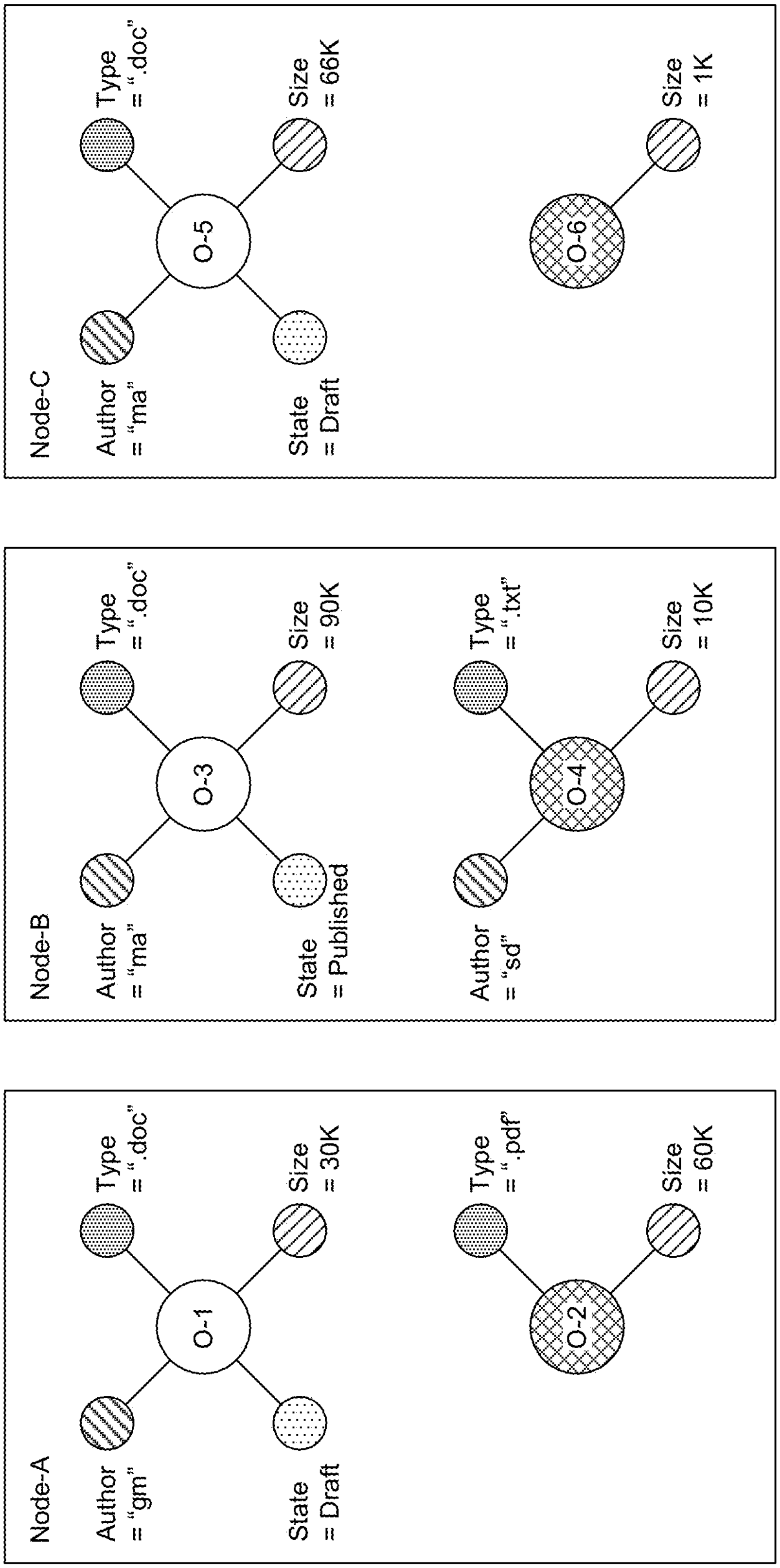
FIG. 11 illustrates the use of both fully populated and sparsely populated metadata.

This concept is illustrated in FIG. 11, which shows examples of both sparsely populated metadata and fully populated metadata for the same type of data object. For example, a given type of data object has the following metadata attributes associated with it: Author, Type, State and Size. Three of the data objects, objects O-1, O-3 and O-5 (stored in Node-A, Node-B and Node-C, respectively) have fully populated metadata, i.e., they each have all four of these attributes associated with them. On the other hand, three other data objects, objects O-2, O-4 and O-6 (stored in Node-A, Node-B and Node-C, respectively) have only sparsely populated metadata. Specifically, object O-2, has only the Type and Size attributes; object O-4 has only the Author, Type and Size attributes; and object O-6 has only the Size attribute.

Figure 12:
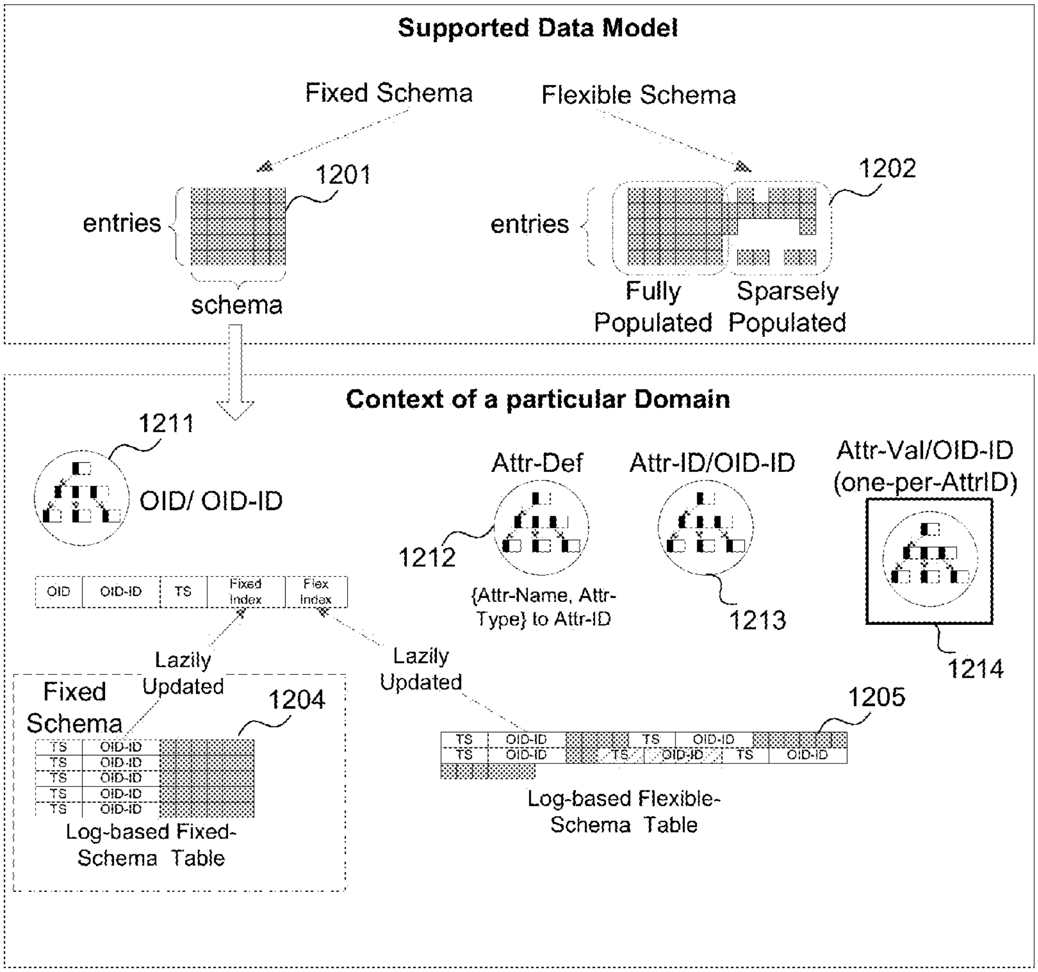
FIG. 12 illustrates the various data structures used to manage metadata under fixed schema and flexible schema data models.

The ability to maintain both fully populated metadata and sparsely populated metadata (even for data objects of the same type) is accomplished, at least in part, by allowing concurrently both fixed-schema and flexible-schema management of metadata, respectively. These two approaches are illustrated in FIG. 12.

If the metadata schema is at least partially known by a user in advance (i.e., the fixed-schema case), that schema information can be supplied to the MDS 54 (e.g., when creating a domain), in which case those metadata attributes are managed as a fixed-width row based structure ("row store") 1201. In this row store, the attribute name is captured implicitly by virtue of the position of the attribute (offset in a record). Thus, storage in this structure is efficient and packed. A schema structure for that domain defines the structure of this fixed-width row store. Attributes which are not pre-identified through a schema (i.e., the flexible schema case) are stored against an OID in an attribute-value list, in the form of a variable-width row store 1202. This flexible schema approach allows for efficient storage of sparsely populated metadata.

The row store approach is used to address look-ups based on OID, to achieve good locality of access for all metadata associated with an OID, since it has the property of having all metadata for an OID being located in the same data structure. Both of the above-mentioned row stores (fixed-width and variable-width) 1201 and 1202 have respective Btree indexes over the OID, as discussed below, to enable access to the record (offset) in the row store. Also, both of the above-mentioned approaches (fixed schema and flexible schema) use a corresponding column store to implement their attribute-based indexes (e.g., the Attr-Val/OID-ID map 1214 in FIG. 12, or indexes 2102 in FIG. 21). A column store has the property of OID locality only along a particular dimension, i.e., a particular attribute. A column store is thus useful in scenarios where it is desirable to query on a specified value of a specified attribute, since all OIDs that match the criterion are located in a small range. On the other hand, if a user wanted to retrieve all metadata for a specific OID, the most efficient mechanism would be to use the row store.

In one embodiment, both types of metadata management/storage (fixed-schema/fixed-width and flexible-schema/variable-width) share a mechanism through which metadata updates occur. Any attribute update is not directly stored in the row store; rather, it is first logged in a temporary log-file 1204 or 1205 before being processed through a background "scanner" process. The scanner process populates the row stores of the appropriate type depending on the attribute being modified. It also updates the relevant indexes. Because this is done as a background process and not directly in response to the update, it is referred to as "lazy" update, which helps to reduce any adverse impact of updates on performance.

In one embodiment, all of the row and column structures mentioned above are maintained both in memory and in persistent storage. While the scanner is not being run, the in-memory structures are used to maintain an interim index over the recently added metadata. This is done so as to avoid missing any metadata when a lookup or query is issued. Thus, any client request to the MDS 54 first does a look-up to these in-memory structures and then goes to the persistent store.

Referring again to the different metadata types, user-defined metadata can be specified by the user through an initial schema, and additional attributes can be subsequently added. Therefore, both the fixed-width and variable-width row storage mechanisms can be used for this type of metadata.

Inferred-latent metadata typically depends on the nature of objects stored in the repository, and these carry a fixed schema. However, some inferred-latent metadata can be mandatory fields while others are optional. The mandatory fields can be maintained in the fixed-width row store while the optional ones are sparse attributes maintained in the variable-width row store. For inferred-discovered metadata, it is preferable that applications be able to discover different metadata attributes and manage them without having to decide in advance what they will need to manage/discover. Therefore, the fixed-width row store generally is not preferred for this type of metadata; instead, the variable-width row store is used. For system-defined metadata, typically the schema will be fixed. Consequently, generally only the fixed-width row store is applicable to this type of metadata.

Referring still to FIG. 12, in one embodiment the MDS 54 maintains several additional data structures to facilitate efficient location and retrieval of metadata. (These data structures maintain metadata about metadata, and as such, they may be more precisely called meta-metadata structures. However, because this term is unwieldy it is not adopted here.) These data structures include an OID/OID-ID map 1211, an Attribute Definition ("Attr-Def") map 1212, and an Attribute/OID-ID map 1213. In addition, for each attribute ID ("Attr-ID") (i.e., for each attribute), the MDS 54 maintains a separate Attribute Value/OID-ID ("Attr-Val/OID-ID") map 1214, which is only used for servicing queries. In one embodiment, each of these data structures is implemented as a conventional B-tree. To improve performance, each of the aforementioned data structures has two instances, one in memory (non-persistent) and the other in persistent storage. Each in-memory instance only stores the changes since the persistent instance was last updated. This approach allows a metadata request to be serviced quickly from the in-memory structures even when the persistent versions have not been updated.

As mentioned above, each data object stored in the content repository has an associated OID, which is a handle used by external entities, such as clients. In addition, each (node-specific) instance of the MDS 54 maintains a separate internal identifier for each OID, which is smaller than a full OID, for use only by that instance; this internal identifier is called an OID-ID. The use of OID-IDs allows for more efficient location and storage of OID information by an instance of the MDS 54. The OID/OID-ID map 1211 therefore is a mapping, specific to an instance of the MDS 54, of OIDs to corresponding OID-IDs.

Each metadata attribute has a name, Attribute Name ("Attr-Name"), which is a handle used by external entities, such as clients, and also has a type, Attribute Type ("Attr-Type") (e.g., string, integer). In addition, each instance of the MDS 54 maintains a separate internal Attribute ID ("Attr-ID") for each Attr-Name. The Attr-Def map 1212, therefore, is a mapping of {Attr-Name, Attr-Type} pairs to corresponding Attr-IDs.

The Attribute/OID-ID map 1213 contains a mapping of Attr-IDs to OID-IDs, to indicate the attributes associated with each data object.

As noted, a separate Attribute Value/OID-ID map 1214 is maintained for each attribute (i.e., each Attr-ID). An Attribute Value/OID-ID map 1214 contains a mapping, sorted by attribute value ("Attr-Val"), of attribute values to OID-IDs. This map can be used, therefore, to determine which data objects contain an attribute having a specified value, such as in response to a user's search query. This map also includes a timestamp, TS, for each Attr-Val, indicating when the value was applied to the associated data object.

In a clustered storage system such as described above, a given item of metadata can be stored in any node in the cluster. It may be most efficient, however, to store all metadata for a data object in the same node in which that data object is stored (e.g., to reduce cross-node communication). As noted above, certain nodes may contain no metadata. The MDS instance in such a node acts merely as a router for routing metadata operation requests and results to or from other MDS instances and is therefore referred to as an "MDS routing instance".

Figure 13:
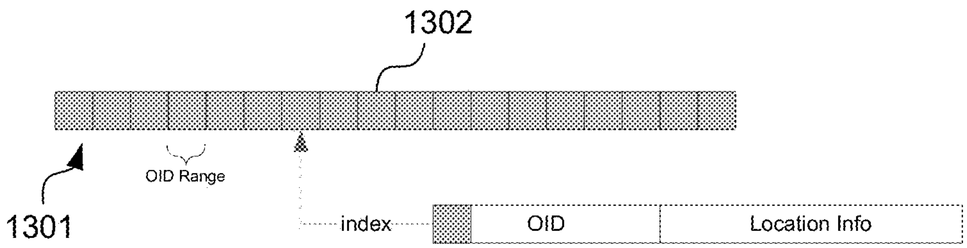
FIG. 13 illustrates an example of a route table used to map an object identifier to a node.

When a user request to perform a metadata operation is received at a node from a client, the MDS instance in that node identifies the node in which the affected metadata is stored (or to be stored). To do this, each instance of the MDS employs a route table, which in one embodiment has the form illustrated in FIG. 13. The route table 1301 is locally constructed by a given instance of the MDS 54 but is globally synchronized with the route table instances in all other nodes of the cluster. The route table 1301 maps each OID to a particular node. More specifically, in the illustrated embodiment each entry 1302 in the route table 1301 corresponds to a separate OID range and contains at least a node ID. The OID range can be indicated by a start index and an end index. Each node in the cluster therefore maps to a specified range of OIDs. Each entry 1302 in the route table 1301 also maps to a separate, specified range of OIDs. In one embodiment, a portion of an OID, such as several of the most significant bits, is used to index into the route table 1301, rather than the entire OID.

In one embodiment, the route table 1301 has a fixed number of entries 1302 and the OIDs are assigned approximately uniformly across all nodes in the cluster. In such an embodiment, the entries in the route table can be allocated uniformly between nodes in approximately the same manner; e.g., for a two-node cluster, half of the entries in the route table would indicate one node as the location while the other half of the entries would indicate the other node as the location. Similarly, for a three-node cluster, each one-third of the entries in the route table would indicate a different node as the location.

In other embodiments, however, it may be desirable to apportion the OIDs to nodes (and, therefore, route table entries) differently. For example, it may be desirable to place an upper bound on the amount of underlying data (data objects) that each entry in the route table can represent, to facilitate rebalancing storage capacity across nodes.

FIGS. 14 through 18 illustrates the process flows associated with the various metadata operations performed by the MDS 54. Refer also to FIG. 2 for the various architectural elements and to FIG. 12 for the various data structures.

Figure 14:
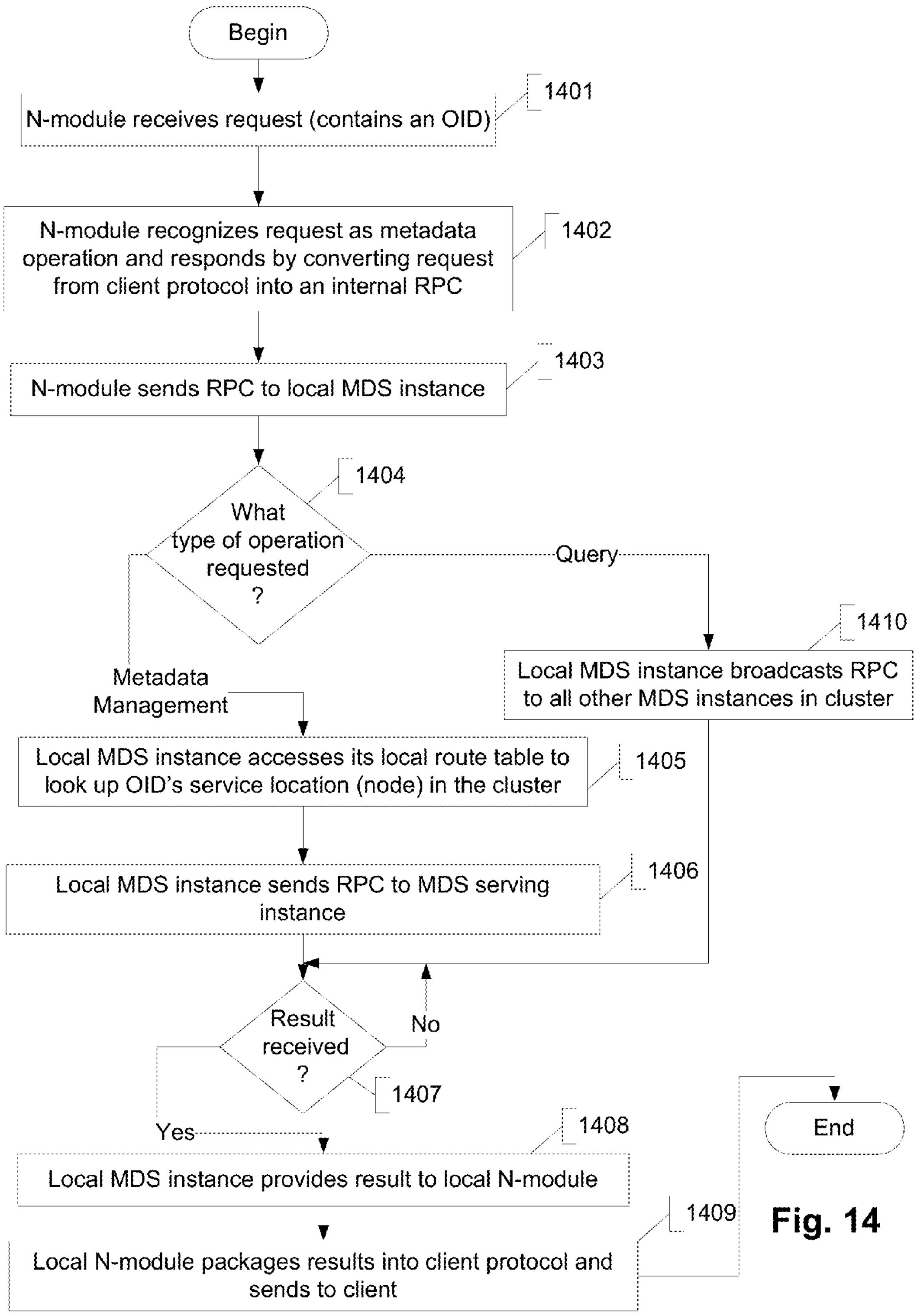
FIG. 14 illustrates the overall process of servicing a client-initiated request (or command) to perform a metadata operation.

FIG. 14 illustrates the overall process of servicing a client-initiated request (or command) to perform a metadata operation, according to one embodiment. Initially, at 1401 an N-module 214 of a node 208 in a storage cluster receives from a client 204 a request to perform a metadata operation. The request contains the OID of the data object to which the metadata operation relates. At 1402 the N-module recognizes the request as being for a metadata operation and responds by converting the request from the client protocol (e.g., HTTP) into an internal RPC. At 1403 the N-module sends the RPC to the MDS service instance in its local M-host 218. The remainder of the process flow then depends on a determination (1404) of what type of metadata operation has been requested.

If the requested operation is for metadata management (SET-ATTR, GET-ATTR, GET-ATTR-VAL, etc.), the process proceeds to 1405, at which the local MDS instance accesses its local route table to look up the specified OID's service location (node) in the cluster (note that this can be the local node). At 1406 the local MDS instance sends an RPC to the MDS serving instance, i.e., the MDS instance in the node identified in the aforementioned route table look-up, to cause the MDS serving instance to execute the requested metadata operation. The specific actions taken by the MDS serving instance depend on what type of operation was requested; the various types of operations are described further below in connection with FIGS. 15 through 18.

When the result of the operation is received by the local MDS instance (1407) (which may be requested metadata, confirmation of success, or an error message), the local MDS instance forwards the result to its local N-module at 1408. At 1409 the local N-module packages the result into the client protocol and sends the result to the initiating client. The process then ends.

If the requested metadata operation was a query, then from 1404 the local MDS instance broadcasts the RPC to all other MDS instances in the cluster at 1410. The process then proceeds directly to 1407, discussed above. Note, therefore, that the route table is not used in servicing a metadata query, since a query is broadcast to all nodes in the cluster.

Figure 15:
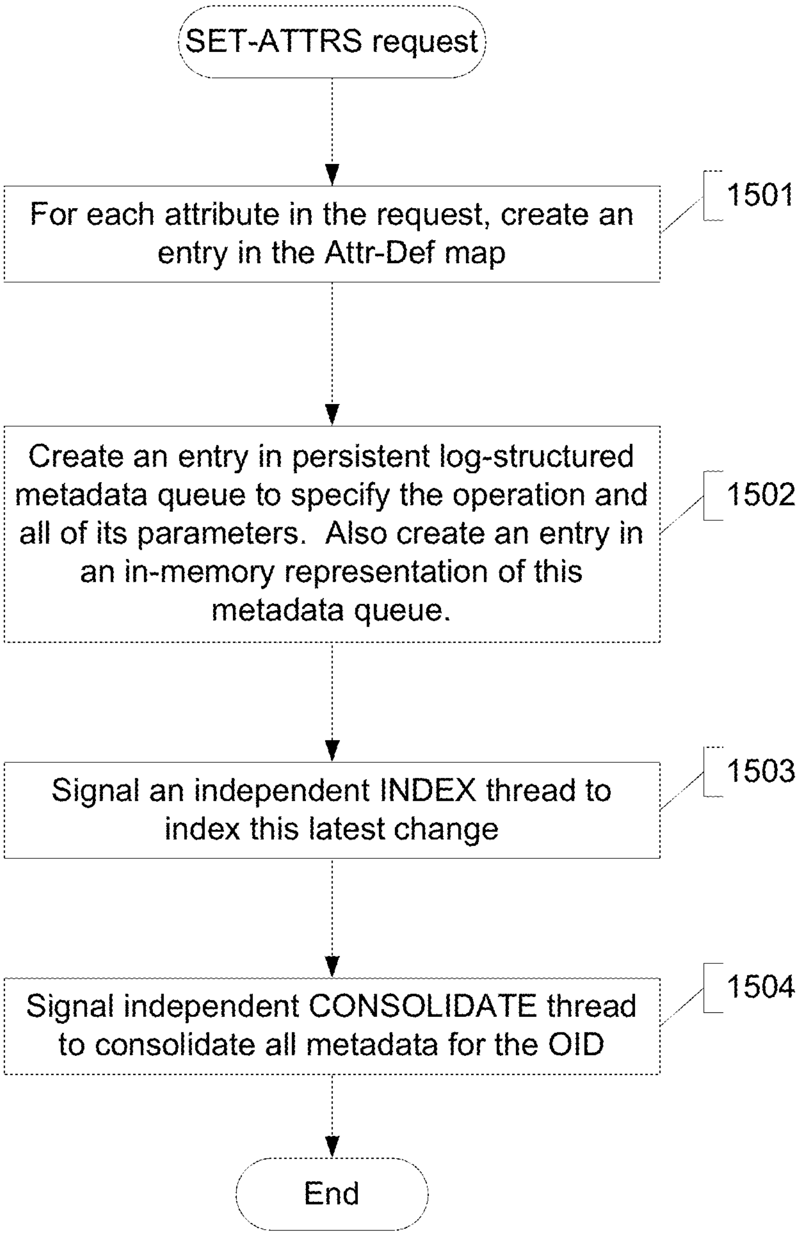
FIG. 15 illustrates an example of the process for a SET-ATTR (set attribute(s)) operation.

FIG. 15 illustrates an example of the process for a SET-ATTR (set attribute) operation. This operation can be used to define one or more attributes and/or to set attribute values. Initially, in response to a SET-ATTR request, the process at 1501 creates an entry in the Attr-Def map 1212 (FIG. 12) for each attribute specified in the request. At 1502 the process creates an entry in the log-structured schema table 1204 to specify the operation and all of its parameters. It also creates an entry in the in-memory representation of this metadata table (see below discussion of "Level-2", FIG. 20). At 1503, the process signals an independent INDEX thread to index this latest change as a background process, and at 1504 the process signals an independent CONSOLIDATE thread to consolidate all of the metadata for the specified OID.

The INDEX thread builds an Attr-Val/OID-ID index 1214 over the applied metadata so that an object (OID-ID) can be looked up based on the value of the metadata attributes that have been applied to it. The log entries once processed are marked as such, so that they can be purged. This thread runs periodically and can be triggered by any of several factors, such as: 1) the amount of change that has happened since it last ran (configurable); 2) the amount of time since it last ran (configurable); 3) the calling thread having requested immediate attention.

The CONSOLIDATE thread consolidates all changes for OIDs scattered in the log into a single location. This is so that any future request to get metadata for an OID will then get all of that metadata in one place. This thread also runs periodically and can be triggered by any one of several factors, such as: 1) the amount of change that has happened since it last ran (configurable); 2) the amount of time since it last ran (configurable); 3) the calling thread having requested immediate attention. There are two structures which get affected by this thread: The Attr-Def map 1212 is updated to reflect the metadata attributes that have been applied to an OID, and the Attr-Val/OID-ID map 1214 is updated to consolidate all metadata values against an OID. This is very helpful for lookups and for metadata replication. The log entries once processed are marked as such, so that they can be purged.

Figure 16:
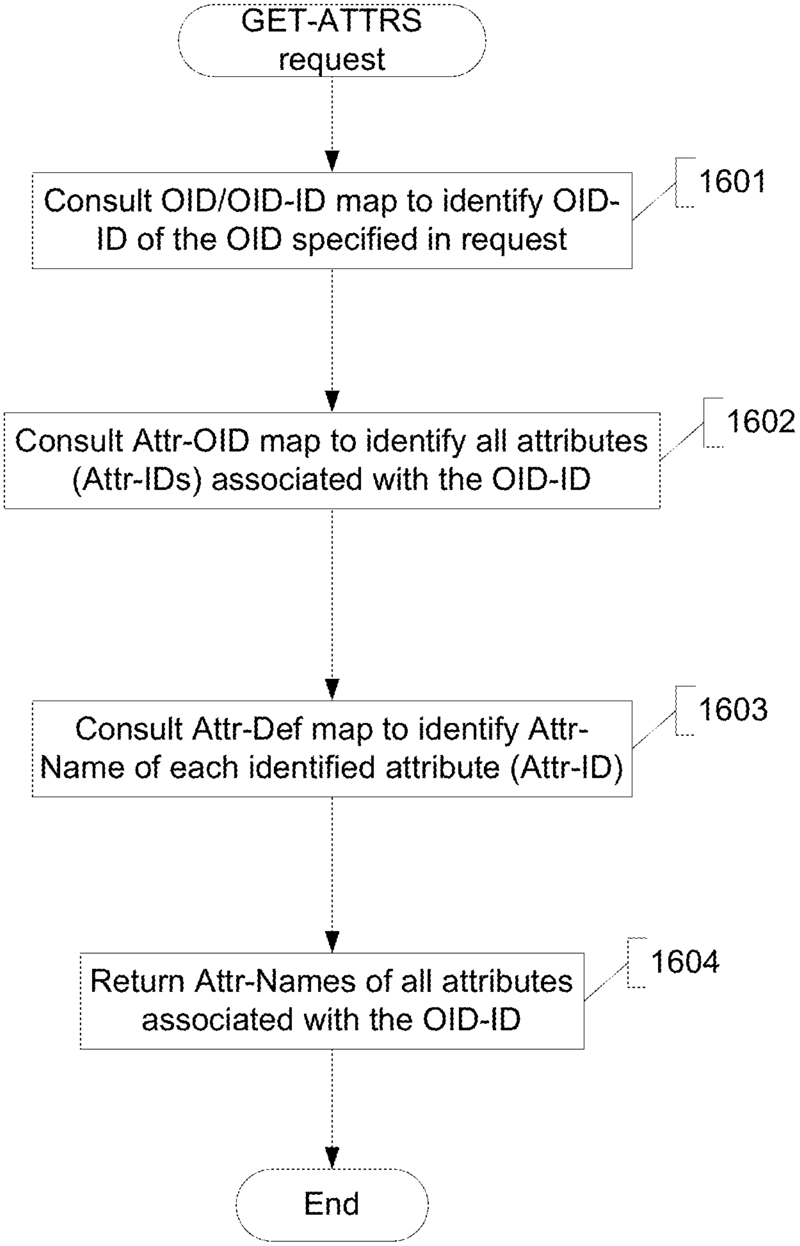
FIG. 16 illustrates an example of the process for a GET-ATTR (get attribute(s)) operation.

FIG. 16 illustrates an example of the process for a GET-ATTR (get attribute) operation. Initially, at 1601 the process consults the OID/OID-ID map 1211 to identify the OID-ID of the OID specified in the request. At 1602 the process consults the Attr-ID/OID-ID map 1213 to identify all attributes (Attr-IDs) associated with the OID-ID. At 1603 the process consults the Attr-Def map 1212 to identify the Attr-Name of each identified Attr-ID. The process then returns all such Attr-Name(s) as the result at 1604.

Figure 17:
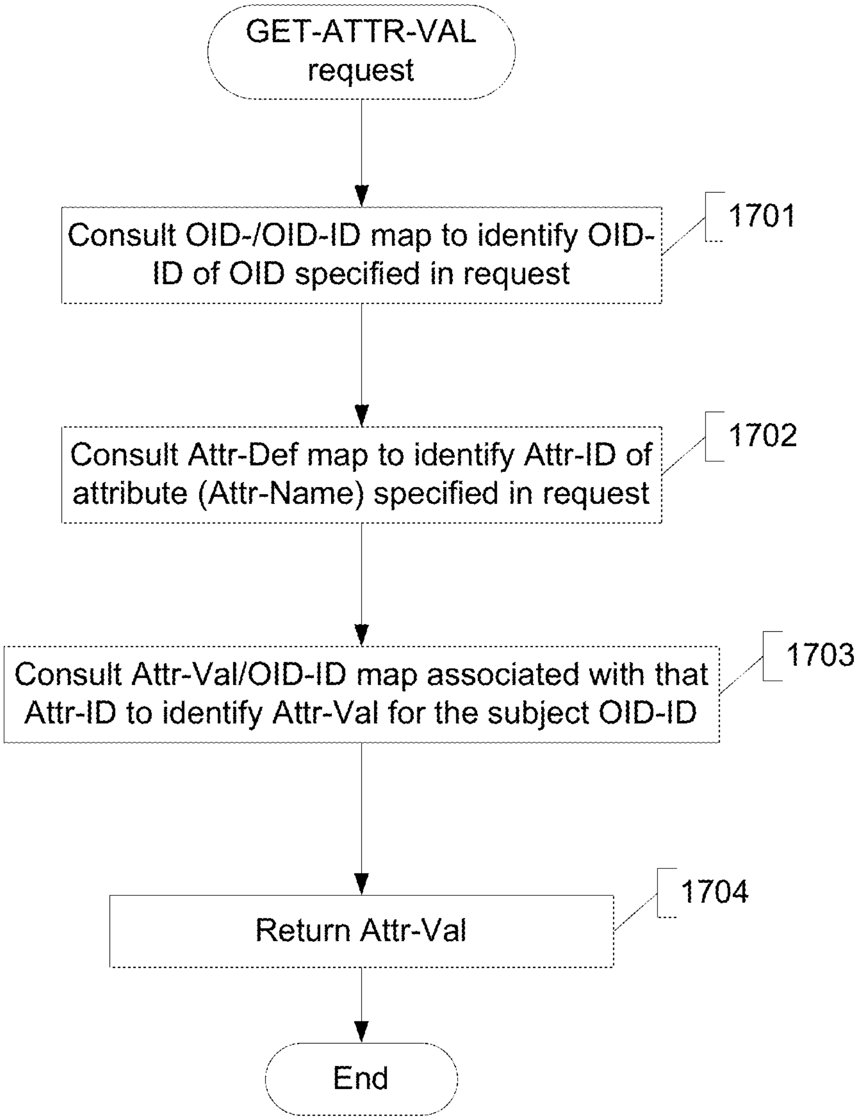
FIG. 17 illustrates an example of the process for a GET-ATTR-VAL (get attribute value) operation.

FIG. 17 illustrates an example of the process for a GET-ATTR-VAL (get attribute value) operation. Initially, at 1701 the process consults the OID/OID-ID map 1211 to identify the OID-ID of the OID specified in the request. At 1702 the process consults the Attr-Def map 1212 to identify the Attr-ID of each Attr-Name specified in the request. At 1703 the process consults the Attr-Val/OID-ID map 1214 associated with each identified Attr-ID, to identify the corresponding Attr-Val (value). The process then returns each such Attr-Val as the result at 1704.

Figure 18:
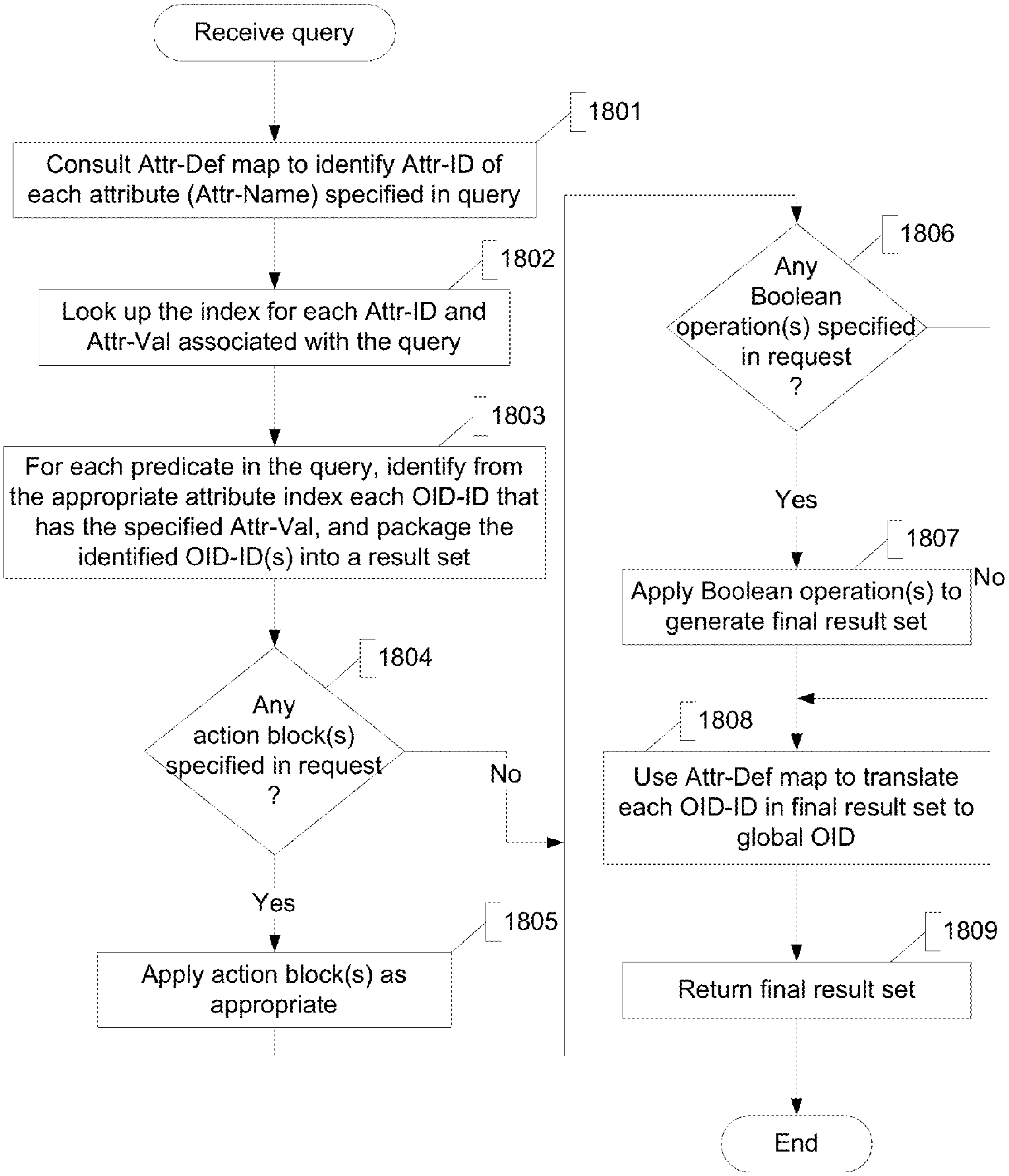
FIG. 18 illustrates an example of the process for servicing a metadata query.

FIG. 18 illustrates an example of the process for servicing a metadata query. Initially, at 1801 the process consults the Attr-Def map 1221 to identify the Attr-ID of each attribute (Attr-Name) specified in the query. Next, 1802 the process locates the appropriate attribute index (Attr-Val/OID-ID map 1214) for each Attr-ID associated with the query. At 1303, for each predicate in the query, the process identifies from the appropriate attribute index each OID-ID that has the Attr-Value specified in the request for the corresponding Attr-Name in the request, and packages the identified OID-ID(s) into a results set.

For every OID-ID found matching the specified criteria, an "action block" can be executed, if specified in the query. The result depends on the nature of the action block. For example, a query may include an action block to perform a summation action, e.g., "Author==gmakkar ACTION SUM DocSize", which returns the sum of sizes of all documents authored by gmakkar. In this example, SUM is a built-in action block. Other possible action blocks can include MAX, MIN, and user-defined action blocks.

If an action block is included in the request (1804), the process applies each such action block as appropriate at 1805. Otherwise, the process proceeds to 1806 and determines whether a Boolean operation is included in the request. If the Boolean operation is included in the request, the specified operation is applied at 1807 to generate a final result set. Otherwise, 1807 is bypassed.

After applying any Boolean operation(s), the process uses the Attr-Def map 1212 to translate each OID-ID in the final result set into its corresponding OID, which is then returned as the (translated) final result set at 1809.

Multi-Level Metadata Handling

Figure 19:
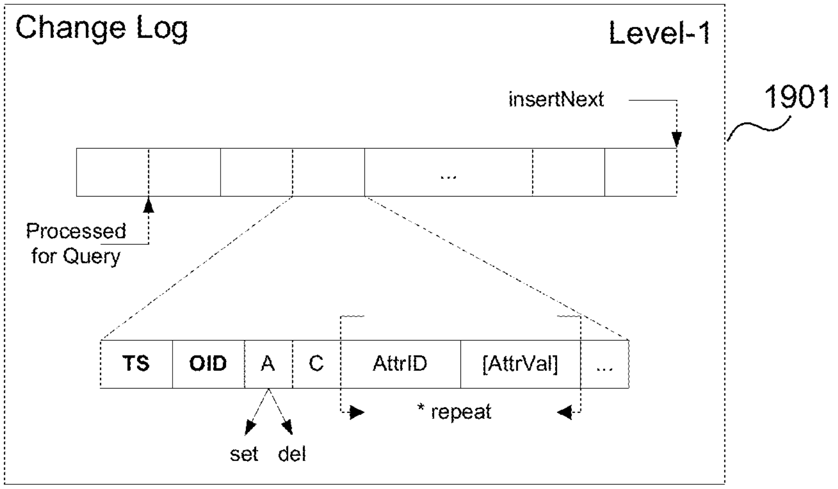
FIG. 19 illustrates a first level ("Level-1") of multi-level metadata operations within a node, for one embodiment.
Figure 20:
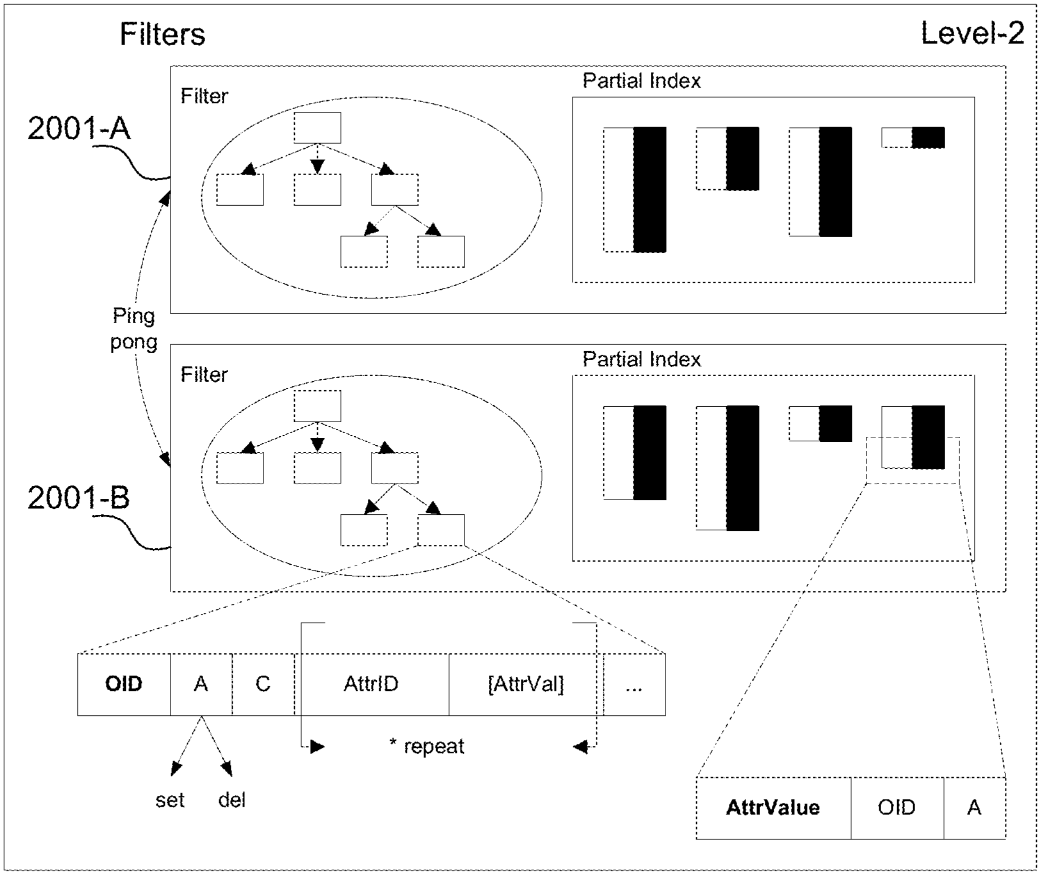
FIG. 20 illustrates a second level ("Level-2") of multi-level metadata operations within a node, for the embodiment of FIG. 18.
Figure 21:
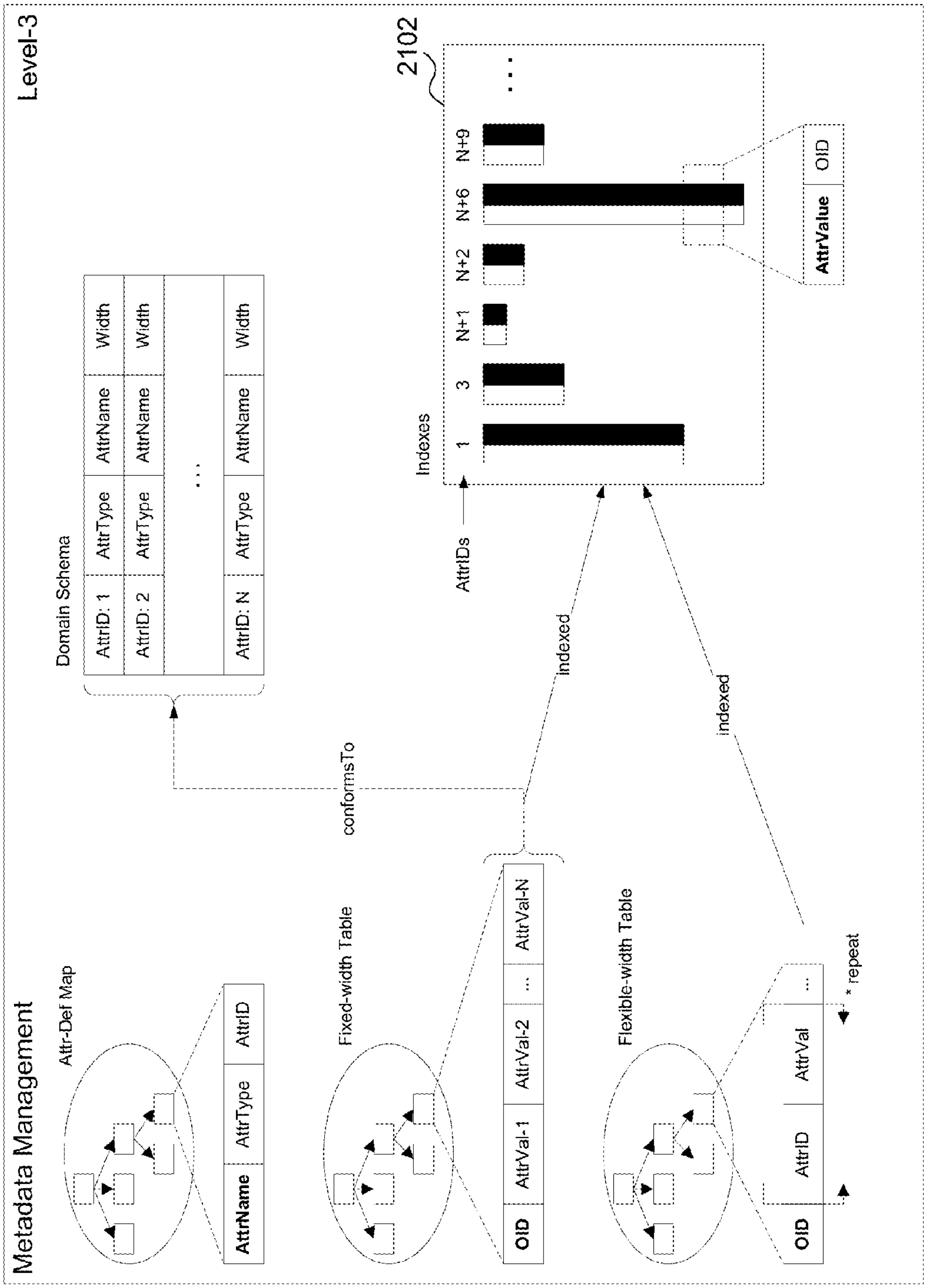
FIG. 21 illustrates a third level ("Level-3") of multi-level metadata operations within a node, for the embodiment of FIG. 18.

FIGS. 19 through 21 illustrate additional details of the handling of metadata within a given node, for a given metadata domain, according to one embodiment. The following description can be a more-specific implementation of the embodiment described above, or it can be a separate embodiment.

As noted above, the MDS 54 uses log structures, illustrated as log files 1204 and 1205 in FIG. 12, to store in chronological order metadata operations on data objects, and then updates the relevant metadata structures to reflect those operations in a "lazy" manner. This allows metadata attributes to be updated in a manner which is highly efficient from a client's perspective without interfering with other service flows, such as reads and queries.

The embodiment illustrated in FIGS. 19 through 21 also uses that approach, but does so using three distinct levels of operation for intra-node metadata operations, called Level-1, Level 2 and Level-3, as explained in detail below. Each level is a transactional level, in that once a transaction completes at a level, the result is remembered across failures.

In general, changes to metadata initially are applied to Level-1, and success of the operation is returned to the requester. However, these changes are not yet merged with the mainstream metadata structures, e.g., Level-3. This is because changing mainstream metadata structures typically involves locking them, and locking out mainstream structures can severely impact other service flows (e.g., reads and queries). However, the Level-1 structures are set up for efficient operation of "remembering" each change request and not for participating in the read or query service flows.

Level-2 is used as a staging area for this purpose, and changes from Level-1 flow into Level-2 either on-demand or when the service queue is empty (idle). Multiple writes can then flow into Level-2 before they are committed to Level-3. In the interim, any metadata operation first involves obtaining a result set from Level-3, and then onto this result set is applied the filter (or delta) of Level-2 to complete the result set. Details of these levels and how they interoperate in the service flows will now be described.

Level-1 is the level that directly interfaces with the incoming requests for metadata operations and is illustrated by example in FIG. 19. An incoming change request is logged in the Change Log 1901, with each log entry (record) the form shown. The request is completely validated before it is logged and before success is returned to the requester. Validation in this context can include, for example, confirming that the attribute type is valid and is not in conflict with the previously known type of that attribute, establishing that the change to that attribute is permitted by the requester, etc.

The changes are not directly applied to Level-2 immediately, for several reasons. First, it may not be necessary to do so, e.g., if no entity is requesting metadata or issuing a query, and thus it is efficient to be "lazy" about propagating changes. This allows for multiple changes to be absorbed, and ingesting metadata becomes a "lightweight" operation. Second, this results in applying metadata becoming a very low-latency operation. Third, this change is secured through lightweight transactions, so even if the system fails, there is a record of the changes.

Records in the change log 1901 are ordered in the time sequence in which they arrived. Further, each record has a timestamp (TS) associated with the time at which it arrived. This timestamp is used in updating Level-2 structures on-demand. The action associated with the request (e.g., set attribute or delete attribute) is also remembered as part of the transaction of logging the change record. This is shown as field "A" in the FIG. 19. Multiple tuples of [AttrID, AttrValue] are placed in this log. A count of how many such tuples are placed is indicated by the count field "C" in FIG. 19. Note that the AttrName is mapped to the AttrID before that change request is logged. This also helps establish the validity of that attribute.

FIG. 20 illustrates the Level-2 structures. Changes from Level-1 flow into this level before being absorbed into Level-3 (FIG. 21). Level-2 is a filter level that contains a partial view, i.e., the most recent changes, organized in a manner such that they can efficiently participate in the various service flows (unlike Level-1). Level-2 differs from the Level-1 in that the changes are sorted on the OID in Level-2 and are not time-ordered like in Level-1. This allows efficient access in the context of the OID-based operations. This level also contains partial indexes built using the changes that were propagated from Level-1. These partial indexes are either additive (in the case of a new metadata applied to an OID) or may act as filters (if metadata is removed), or both if metadata for an attribute is changed (removal on old attrVal, additive on new attrVal).

There are multiple advantages to having a Level-2. For example, changes can be batched before being applied to Level-3, resulting in greater efficiency. Also, batched changes are presorted, thus allowing always forward reading of blocks in Level-3. Additionally, batched changes can be scheduled during idle times.

The OID-sorted change records and the partial index together form an Indexed Change Set. There are two Indexed Change Sets, 2001-A and 2001-B in FIG. 20. The change set should be immutable when changes are being synced to Level-3. Therefore, at any given instant in time, one of the two Indexed Change Sets is "active" while the other is "immutable" (static). The Indexed Change Set that is "being synced" with Level-3 is immutable, and new changes are brought into the other (active) Indexed Change Set. Their roles change when it becomes time to sync changes from the other change set. Indexed Change Sets 2001-A and 2001-B are, therefore, a double-buffered set, whose roles alternate in a ping-pong manner.

The Level-3 structures are illustrated in FIG. 21. Level-3 contains the bulk of the metadata and indexes. Changes to this level come only from Level-2. Those changes are presorted and are thus efficient to apply to Level-3. Changes from Level-2 (from a single Indexed Change Set) to Level-3 are typically propagated in a single transaction (one-shot). However, there is an exception to this case where only a partial change set is propagated to Level-3 (this is possible without requiring much complexity, because the changes applied from Level-2 to Level-3 are idempotent and can be applied any number of times without impacting the result). The exception occurs when the background scanner (discussed further below) cannot start to drain an Indexed Change Set into Level-3 because idle times are disrupted by service requests. This results in the scanner aborting and then at a later time resuming from the point at which it aborted.

Thus, for the most part, all of Level-3 including its indexes 2102 is immutable. Changes to Level-3 are not done as part of a need (i.e., not on-demand). Rather, they are done as part of a background scanner.

The process service flows for the embodiment of FIGS. 19 through 21 shall now be described.

Applying Metadata

To apply metadata to an object, the system initially looks up, in the Attr-Def map 2101, the attribute name ("Attr-Name") specified in the SET-ATTR request, and gets the corresponding attrID. If the attribute already exists with the same attribute type ("attrType"), then a valid attrID is returned. Otherwise an error is returned. If an entry does not already exist, an entry is created and a new attrID is returned. Any other checks that need to be made to confirm that the change is allowed are done. Next, an entry is created in the Attr-Def map 2101 with the following information: current timestamp, OID, Action (set), AttrID, AttrVal. The transaction is then committed. This committed transaction is placed at the"insertNext" location of the change log 1901, as indicated in FIG. 19. Note that the use of the change log 1901 allows this transaction to be "lightweight", as described above.

Getting Metadata

When a GET-ATTR request is received, initially the timestamp (TS) is recorded. The Attr-Name is then resolved to an attrID using the Attr-Def map 2101, to confirm that such an attribute actually exists. If not, an error is returned. Assuming the attribute exists, the Change Log 1901 (Level-1) is then traversed until this request's timestamp is higher than the timestamp of the recorded transaction in the Change Log. If the recorded transaction also has the same OID as the one in the request, this change is identified to be propagated to Level-2. All relevant changes are collected, and the ones identified to be propagated are tagged as having been propagated.

The identified changes to be propagated are then propagated to Level-2. These changes are applied to the active Indexed Change List in Level-2. However, only the OID-sorted filter is updated, not the indexes.

The following steps are then executed: First, the attribute is looked up in the active Indexed Change Set 2001-A or 2001-B. If it is found, the value is returned. If it is not found, then the attribute is looked up in the immutable Indexed Change Set. If it is found, the value is returned. If it is not found in either of the above two Indexed Change Sets, then the attribute is looked up in the Level-3 structures. If it is found, the value is returned.

Note that the GET-ATTR operation as described here is efficient, because all metadata for an OID is located in one place (as it is a btree on the OID).

Getting Schema

When a request to get a metadata schema is received, initially the timestamp (TS) of the request is recorded. The Change Log 1901 is then traversed until this request's timestamp is higher than the timestamp of the recorded transaction in the Change Log. If the recorded transaction also has the same OID as the one in the request, this change is identified to be propagated to Level-2. All relevant changes are collected, and the ones identified to be propagated are tagged as having been propagated.

The identified changes to be propagated are then propagated. These changes are applied to the active Indexed Change List in Level-2. However, only the OID-sorted filter is updated and the indexes are not yet updated.

The following steps are then executed: First, all attributes applied to the OID are fetched from Level-3 structures. The schema changes are then applied to the above attributes from the immutable Indexed Change List 2001-A or 2001-B. The schema changes from the active Indexed Change List are then applied to this result. The final list is then returned to the requester.

Removing Metadata

Removal of metadata attributes is done by a background process ("scanner"). To remove metadata, the process first looks up, in the Attribute Map, the Attr-Name name specified in the request, and gets the corresponding attrID. If the attribute already exists with the same attrType, a valid attrID is returned, otherwise an error is returned. Assuming the attribute exists, any other checks that need to be made to confirm that the change is allowed are done. An entry is then created with the following information: current timestamp (TS), OID, Action (delete), AttrID. The transaction is then committed. This committed transaction is placed at the "insertNext" location (FIG. 19).

Destroying Metadata

Destruction of metadata attributes is also done by a scanner. To destroy metadata, the process creates an entry with the following information: current timestamp, OID, Action (del), AttrID=0 (indicating ALL). The transaction is then committed. This committed transaction is placed at the "insertNext" location (FIG. 19).

Query

When a metadata query request is received, initially the timestamp (TS) is recorded. If "sync" is specified as one of the parameters of the query, the process first updates the indexes in the active Indexed Change Set 2001-A or 2001-B. This involves traversing the Change Log 1901 in Level-1 starting from the "Processed for Query" location (FIG. 19) and processing each record until the end of the list is reached. No attempt is made to update the OID-sorted filter in the active Indexed Change Set.

When updating the indexes, the following steps are executed. First, if the Change Log entry is a "del" (delete) and AttrID does not equal "0", the value associated with the specified AttrID is looked up from the active Indexed Change Set, the immutable Indexed Change Set and the Level-3 structures, in that order. If it is not found, this "del" request is ignored. Otherwise, the value obtained is inserted into the active Indexed Change Set's index corresponding to the AttrID specified in the Change Log entry. Against that entry, "del" is specified.

If, on the other hand, the Change Log entry is a "del" and AttrID is equal to "0", the indexes are not modified at this time, but this OID is remembered in a special OID-mask (not shown; can be simply a sorted list of OIDs) in the active Indexed Change Set.

If the Change Log entry represents a "set" operation with a value, NewValue, then the following substeps are performed:

1) Check whether an earlier change exists in the active Indexed Change Set. If so, then get the old attrValue into OldValue, and skip to step 4 below.

2) Check whether an earlier change exists in the immutable Indexed Change Set. If so, then get the old attrValue into OldValue, and skip to step 4 below.

3) Check whether an earlier value exists in the Level-3 structures. If so, then get the old attrValue into OldValue.

4) In the active Indexed Change Set's index corresponding to the AttrID specified in the ChangeLog entry, mark the entry with value OldValue against the OID (being processed), as "del". Also, mark the entry with value NewValue against the same OID, as "set".

Next, for every predicate of a multi-predicate query, the query servicing process does the following. First, it gets the list of OIDs matching the predicate from the index structures 2102 of Level-3. Next it gets the list of OIDs matching the predicate, from the index structures of immutable Indexed Change Set 2001-A or 2001-B (FIG. 20). All OIDs that appear against "del" entries are collected in a Predicate-OID-mask. The process then gets the list of OID matching the predicate from the index structures of active Indexed Change Set. All OIDs that appear against "del" entries are then collected in a Predicate-OID-mask.

Next, the process excludes OIDs from the above list which are also in the OID-mask of immutable Indexed Change Set. It further excludes OIDs from the above list which are also in the OID-mask of active Indexed Change Set, and then excludes OIDs from the above list which are also in the Predicate-OID-mask. The remaining OID is the partial result set for that predicate. The partial result set from all predicates in the query are then combined to get the partial result set from this node.

Background Processes ("Scanners")

The MDS 54 employs background processes ("scanners") to update the structures shown in Level-2 and Level-3. The scanner for updating Level-2 entries from Level-1 can be triggered by any of several factors, such as: the service has not been serving any clients for a specified period of time; a configurable time has elapsed since the last time this scanner ran; or a configurable number of change requests have been submitted. This scanner updates the indexes of the active Indexed Change Set, by traversing over all records in the ChangeLog. The detailed procedure is described above as part of the query processing service flow. This is done before the OID-sorted filter is updated, because it is much less resource intensive to update an OID-sorted filter inline. Additionally, this scanner updates the OID-sorted filter of the active Indexed Change Set, by traversing over all records in the ChangeLog. The detailed procedure is described above as part of the "Getting Metadata" processing service flow.

A second scanner updates Level-3 entries from Level-2. This scanner can be triggered by any of several factors, such as: the service has not been serving any clients for a specified period of time; a configurable amount of time has elapsed since the last time this scanner ran; or a configurable number of change requests have been submitted. For the sake of efficiency it may be desirable to limit the number of levels, of the B-tree for the OID-sorted structure, that this scanner processes.

The scanner for updating from Level-2 to Level-3 performs the following actions:

1) marks the immutable Indexed Change Set as "synced" (to Level-3);

2) switches the roles of the active and immutable Indexed Change Sets;

3) updates the indexes at Level-3 by traversing the indexes in the immutable Indexed Change Set;

4) updates the fixed-width table and the flexible-width tables with the changes in the OID-sorted filters;

5) marks the immutable Indexed Change Set as being "synced".

Replication of Metadata

Replication of metadata may be desirable for any of the following reasons, for example: 1) load balancing, such that reads and queries can be supported from more than one node; 2) capacity balancing, such that when a new node is added to the system, metadata can be moved from a "full" node to the new node, such that the capacity is balanced; 3) backup of the metadata store. In one embodiment there are two types of replication available: Metadata Only and Full. Metadata Only backup is used for capacity balancing or backup, whereas Full replication is used for load balancing or backup.

Metadata Only replication involves, in one embodiment, replicating only the metadata itself but not its indexes. Indexes, if required, are built at the destination once the replication has completed. Because the amount of metadata to be transferred in the capacity balancing case can be significant, this can be carried out as a slow background operation with the entire range of transfer being broken down into “transfer chunks”. A transfer chunk is a range of OIDs and their metadata. Once a transfer chunk has been transferred, the route table is updated to reflect the new locations which will serve the affected OIDs. Since metadata in a transfer chunk might have changed while the transfer was in progress, changes to a transfer chunk are tracked separately. Multiple iterations of this transfer may be required before the routing table is updated.

The MDS 54 can also support incremental Metadata Only replication, such that only those portions of the metadata that have changed since the last Metadata Only replication are sent to the destination. This can be achieved through backing storage used by the in-memory data structures of the MDS 54. This is typically used for backup and not in capacity balancing.

Full replication involves replicating the metadata and all related indexes. This is typically triggered by a management application in the system which decides on the number of replicas required. In one embodiment the mechanisms of creating a full replica do not reside within the MDS. In such an embodiment, MDS service needs to be quiesced before a replica can be initiated. When a quiesce is initiated, all in-memory state is flushed to persistent storage. Indexing and Consolidation may not be complete when a quiesce is in effect. Consequently, the management application which triggered this quiesce can then trigger a snapshot to capture that state of the MDS. Immediately thereafter the MDS is unquiesced. The snapshot can then be used to create a full replica at a remote location. If it is desired that the full replica contain consolidated metadata structures with updated indexes, this is done (by executing those threads) after replication is complete, since the MDS is active at the source in the active file system.

Thus, as described above the MDS provides the following advantageous features:

1) Ability to manage a wide range of metadata, from metadata sparsely applied to few objects in the content repository to metadata applied to all objects in the content repository.

2) Layout of metadata on a node in a manner which is efficient for both updates and metadata queries.

3) Efficient metadata distribution across nodes in a cluster to minimize cross-node communication.

4) Distributed execution of multi-predicate metadata queries.

5) Ability to specify and support different types of metadata.

6) Ability to associate more than one type of schema to a data object, and correspondingly, the ability of the schema of an object to evolve as needed.

7) Ability to perform predefined and custom actions which are applied to a list of selected objects.

8) Ability to persist queries and query results.

9) Ability to store metadata in different storage tiers based on application defined policies.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A “machine-readable medium”, as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term “logic”, as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

maintaining a distributed object store to store a plurality of data objects in a network storage system; and operating a metadata subsystem in the network storage system to store and retrieve metadata of a plurality of types, relating to the plurality of data objects, including storing the metadata in locations that are independent of locations where corresponding data objects of the plurality of data objects are stored, the plurality of types of metadata including system defined metadata, inferred metadata and user-defined metadata, wherein the inferred metadata includes latent metadata and discovered metadata, wherein latent metadata includes data gathered by an application from data associated with the plurality of data objects, the gathered data being subsequently stored as metadata relating to the plurality of data objects, wherein discovered metadata includes relational information derived by the application from the data associated with the plurality of data objects, the relational information describing a relationship between two or more data objects of the plurality of data objects, and further operating the metadata subsystem to search the metadata of the plurality of types to identify data objects that satisfy user-specified search queries, wherein operating the metadata subsystem comprises implementing a plurality of mutually isolated query domains, wherein said metadata includes a plurality of metadata attribute-value pairs, wherein each of the metadata attribute-value pairs is assigned to one of the plurality of query domains, wherein each query domain of the plurality of mutually isolated query domains is a logical construct used to isolate the metadata attribute-value pairs assigned to the particular query domain from the metadata attribute-value pairs assigned to the other query domains of the plurality of query domains, and wherein each operation performed by the metadata subsystem is performed within the context of at least one of the plurality of query domains.

2. A method as recited in claim 1, wherein operating the metadata subsystem further comprises operating a plurality of instances of the metadata subsystem, each instance residing on a different one of a plurality of storage nodes, to collectively implement the particular query domain of the plurality of query domains.

3. A method as recited in claim 1, wherein operating the metadata subsystem comprises allowing at least some of the plurality of data objects to have different numbers of attributes than others of the plurality of data objects.

4. A method as recited in claim 1, wherein operating the metadata subsystem comprises allowing fixed-schema storage and allowing flexible-schema storage to be used to store metadata associated with the plurality of data objects.

5. A method as recited in claim 4, wherein operating the metadata subsystem comprises using both fixed-schema storage and flexible-schema storage concurrently to store metadata associated with the plurality of data objects.

6. A method as recited in claim 1, wherein operating the metadata subsystem comprises storing all of the metadata for each particular data object of the plurality of data objects in the same network storage node.

7. A method as recited in claim 6, wherein operating the metadata subsystem comprises storing all of the metadata for any particular data object in the network storage node in which the particular data object is stored.

8. A method as recited in claim 6, wherein the metadata for a particular data object comprises a plurality of attribute values, and wherein operating the metadata subsystem comprises placing each of the attribute values of the particular data object in a separate one of a plurality of indexes.

9. A method as recited in claim 1, wherein operating the metadata subsystem comprises maintaining a plurality of indexes, each corresponding to a different metadata attribute.

10. A method as recited in claim 1, wherein operating the metadata subsystem comprises receiving and servicing a multi-predicate user metadata query.

11. A method as recited in claim 1, wherein operating the metadata subsystem comprises:

using a log structure to store in a chronological order a plurality of metadata operations relating to different data objects; and updating a plurality of metadata structures based on contents of the log structure, wherein said updating is not directly triggered by any of said plurality of metadata operations.

12. A network storage server node comprising:

a network module using which the node can communicate with a network storage client;

a data module using which the node can manage a persistent storage subsystem; and a management host configured to provide management services of the network storage server node and to interface with an external administrative user, the management host including a metadata subsystem to store and retrieve metadata of a plurality of types, relating to a plurality of data objects stored in a distributed object store implemented at least partially in the persistent storage subsystem, wherein the metadata subsystem is configured to store the metadata in locations that are independent of locations where corresponding data objects of the plurality of data objects are stored, the plurality of types of metadata including system defined metadata, inferred metadata and user-defined metadata, wherein the inferred metadata includes latent metadata and discovered metadata, wherein latent metadata includes data gathered by an application from the data associated with the plurality of data objects, the gathered data subsequently being stored as metadata relating to the plurality of data objects, wherein discovered metadata includes relational information derived by the application from the data associated with the plurality of data objects, the relational information describing a relationship between two or more data objects of the plurality of data objects, the metadata subsystem further being capable of searching the metadata of the plurality of types to identify data objects that satisfy user-specified search queries, wherein the metadata subsystem is configured to implement a plurality of mutually isolated query domains, wherein said metadata includes a plurality of metadata attribute-value pairs, wherein each of the metadata attribute-value pairs is assigned to one of the plurality of query domains, wherein each query domain of the plurality of mutually isolated query domains is a logical construct used to isolate the metadata attribute-value pairs assigned to the particular query domain from the metadata attribute-value pairs assigned to the other query domains of the plurality of query domains, and wherein each operation performed by the metadata subsystem is performed within the context of at least one of the plurality of query domains.

13. A network storage server node as recited in claim 12, wherein the network storage server node is one of a plurality of network storage server nodes in a clustered network storage system.

14. A network storage server node as recited in claim 12, wherein the metadata subsystem is one of a plurality of similar metadata subsystem instances, each instance residing on a different one of a plurality of storage nodes, to collectively implement the particular query domain of the plurality of query domains.

15. A network storage server node as recited in claim 12, wherein the metadata subsystem is configured to allow at least some of the plurality of data objects to have different numbers of attributes than others of the plurality of data objects.

16. A network storage server node as recited in claim 12, wherein the metadata subsystem is configured to allow both fixed-schema storage and flexible-schema storage to be used to store metadata associated with the plurality of data objects.

17. A network storage server node as recited in claim 16, wherein the metadata subsystem is configured to use both fixed-schema storage and flexible-schema storage concurrently to store metadata associated with the plurality of data objects.

18. A network storage server node as recited in claim 12, wherein the metadata subsystem is configured to store all of the metadata for each particular data object of the plurality of data objects in the same network storage node.

19. A network storage server node as recited in claim 18, wherein the metadata subsystem is configured to store all of the metadata for any particular data object in a network storage node in which the particular data object is stored.

20. A network storage server node as recited in claim 18, wherein the metadata for a particular data object comprises a plurality of attribute values, and wherein the metadata subsystem is configured to place each of the attribute values of the particular data object in a separate one of a plurality of indexes.

21. A network storage server node as recited in claim 12, wherein the metadata subsystem is configured to maintain a plurality of indexes, each corresponding to a different metadata attribute.

22. A network storage server node as recited in claim 12, wherein the metadata subsystem is configured to receive and service a multi-predicate user metadata query.

23. A network storage server node as recited in claim 12, wherein the metadata subsystem is configured to:

use a log structure to store in a chronological order a plurality of metadata operations relating to different data objects; and update a plurality of metadata structures based on contents of the log structure, wherein said updating is not directly triggered by any of said plurality of metadata operations.

24. A network storage server node comprising:

a network adapter through which to receive a data access request from a storage client via a network;

a storage adapter through which to access a persistent storage subsystem;

a memory; and a processor coupled to the memory and implementing a metadata subsystem, to store and retrieve metadata of a plurality of types, relating to a plurality of data objects stored in a distributed object store implemented at least partially in said persistent storage subsystem, including storing the metadata in locations that are independent of locations where corresponding data objects of the plurality of data objects are stored, the plurality of types of metadata including system defined metadata, inferred metadata and user-defined metadata, wherein the inferred metadata includes latent metadata and discovered metadata, wherein latent metadata includes data gathered by an application from the data associated with the plurality of data objects, the gathered data subsequently being stored as metadata relating to the plurality of data objects, wherein discovered metadata includes relational information derived by the application from the data associated with the plurality of data objects, the relational information describing a relationship between two or more data objects of the plurality of data objects, the metadata subsystem being configured to search metadata of the plurality of types to identify data objects that satisfy user-specified search queries, wherein the metadata subsystem is configured to implement a plurality of mutually isolated query domains, wherein said metadata includes a plurality of metadata attribute-value pairs, wherein each of the metadata attribute-value pairs is assigned to one of the plurality of query domains, wherein each query domain of the plurality of mutually isolated query domains is a logical construct used to isolate the metadata attribute-value pairs assigned to the particular query domain from the metadata attribute-value pairs assigned to the other query domains of the plurality of query domains, and wherein each operation performed by the metadata subsystem is performed within the context of at least one of the plurality of query domains.

25. A network storage server node as recited in claim 24, wherein the metadata subsystem is configured to use both fixed-schema storage and flexible-schema storage concurrently to store metadata associated with the plurality of data objects.

26. A network storage system comprising:

a distributed object store to store a plurality of data objects, the distributed object store implemented in a plurality of storage nodes of a network storage system;

means for storing and retrieving metadata of a plurality of types, relating to the data objects, including storing the metadata in locations that are independent of locations where corresponding data objects of the plurality of data objects are stored, the plurality of types of metadata including system defined metadata, inferred metadata and user-defined metadata, wherein the inferred metadata includes latent metadata and discovered metadata, wherein latent metadata includes data gathered by an application from the data associated with the plurality of data objects, the gathered data subsequently being stored as metadata relating to the plurality of data objects, wherein discovered metadata includes relational information derived by the application from the data associated with the plurality of data objects, the relational information describing a relationship between two or more data objects of the plurality of data objects; and means for identifying data objects that satisfy user-specified search queries by searching the metadata of the plurality of types, wherein the means for identifying data objects is configured to implement a plurality of mutually isolated query domains, wherein said metadata includes a plurality of metadata attribute-value pairs, wherein each of the metadata attribute-value pairs is assigned to one of the plurality of query domains, wherein each query domain of the plurality of mutually isolated query domains is a logical construct used to isolate the metadata attribute-value pairs assigned to the particular query domain from the metadata attribute-value pairs assigned to the other query domains of the plurality of query domains, and wherein each operation performed by the means for identifying data objects is performed within the context of at least one of the plurality of query domains.

* * * * *

UNITED STATES PATENT AND TRADEMARK OFFICE

CERTIFICATE OF CORRECTION

PATENT NO. : 8,484,259 B1
APPLICATION NO. : 12/853191
DATED : July 9, 2013
INVENTOR(S) : Gaurav Makkar et al.

It is certified that error appears in the above-identified patent and that said Letters Patent is hereby corrected as shown below:

In the Drawings

On sheet 4 of 61, in Figure 4, Reference Numeral 410, line 2, delete “Protocl” and insert -- Protocol --, therefor.

Signed and Sealed this
Eleventh Day of February, 2014

Michelle K. Lee
*Deputy Director of the United States Patent and Trademark Office*